United States Patent
Zhou et al.

(10) Patent No.: US 11,270,256 B2
(45) Date of Patent: Mar. 8, 2022

(54) MATERIAL ORGANIZATION TASK GENERATION METHOD AND DEVICE, AND MATERIAL ORGANIZATION METHOD AND DEVICE

(71) Applicant: HANGZHOU HIKROBOT TECHNOLOGY CO., LTD, Hangzhou (CN)

(72) Inventors: Senshan Zhou, Hangzhou (CN); Keping Zhu, Hangzhou (CN); Shengkai Li, Hangzhou (CN)

(73) Assignee: HANGZHOU HIKROBOT TECHNOLOGY CO., LTD, Hangzhou (CN)

( * ) Notice: Subject to any disclaimer, the term of this patent is extended or adjusted under 35 U.S.C. 154(b) by 103 days.

(21) Appl. No.: 16/468,242

(22) PCT Filed: Aug. 10, 2017

(86) PCT No.: PCT/CN2017/096767
§ 371 (c)(1),
(2) Date: Jun. 10, 2019

(87) PCT Pub. No.: WO2018/107786
PCT Pub. Date: Jun. 21, 2018

(65) Prior Publication Data
US 2019/0333009 A1 Oct. 31, 2019

(30) Foreign Application Priority Data
Dec. 13, 2016 (CN) .......................... 201611145086.2

(51) Int. Cl.
*G06Q 10/08* (2012.01)
*G06Q 10/06* (2012.01)

(52) U.S. Cl.
CPC ..... *G06Q 10/087* (2013.01); *G06Q 10/06316* (2013.01)

(58) Field of Classification Search
CPC ........... G06Q 10/087; G06Q 10/06316; G06Q 10/063114; G06Q 10/06312; G06Q 10/083; H04W 4/029; H04W 4/33; G06F 9/451
See application file for complete search history.

(56) References Cited

U.S. PATENT DOCUMENTS 8,594,835 B2* 11/2013 Lert ..................... B65G 1/1371
700/221
9,242,799 B1* 1/2016 O'Brien ................. G06Q 10/08
(Continued)

FOREIGN PATENT DOCUMENTS

| CN | 101417732 | 4/2009 |
|----|-----------|--------|
| CN | 101763075 | 6/2010 |

(Continued)

OTHER PUBLICATIONS

Li, Jiaxi, Mohsen Moghaddam, and Shimon Y. Nof. "Dynamic storage assignment with product affinity and ABC classification—a case study." The International Journal of Advanced Manufacturing Technology 84.9-12 (2016): 2179-2194. (Year: 2016).*

(Continued)

*Primary Examiner* — Matthew S Gart
*Assistant Examiner* — Hamzeh Obaid
(74) *Attorney, Agent, or Firm* — Norton Rose Fulbright US LLP

(57) ABSTRACT

A method and apparatus for generating a material arrangement task. The method includes: receiving a target area arrangement instruction for a target warehouse, wherein the instruction includes at least one shelf number (S101); classifying a storage space corresponding to each shelf number (Continued)

in the instruction into a destination storage space set or a source storage space set according to pre-stored inventory information of the target warehouse (S102); determining whether there is at least one packing case in a storage space in the source storage space set that can be moved into a storage space in the destination storage space set, and if so, generating a material arrangement task; wherein the material arrangement task includes a shelf number corresponding to a source storage space and/or a shelf number corresponding to a destination storage space (S103).

14 Claims, 11 Drawing Sheets

(56) References Cited

U.S. PATENT DOCUMENTS

| | | | |
|---|---|---|---|
| 9,488,984 B1* | 11/2016 | Williams | G06K 9/2036 |
| 2005/0278062 A1 | 12/2005 | Janert et al. | |
| 2006/0071774 A1* | 4/2006 | Brown | G07F 9/026 |
| | | | 340/522 |
| 2009/0299792 A1 | 12/2009 | Baur et al. | |
| 2012/0330458 A1 | 12/2012 | Weiss | |
| 2013/0248597 A1 | 9/2013 | Yuan et al. | |
| 2013/0317642 A1 | 11/2013 | Asaria et al. | |
| 2014/0074342 A1* | 3/2014 | Wong | B66F 9/0755 |
| | | | 701/26 |
| 2014/0343713 A1* | 11/2014 | Ziegler | B65G 1/137 |
| | | | 700/214 |
| 2015/0262118 A1* | 9/2015 | Grissom | G06Q 10/06315 |
| | | | 700/216 |
| 2016/0042314 A1* | 2/2016 | Mountz | G08C 17/02 |
| | | | 705/28 |
| 2017/0091704 A1* | 3/2017 | Wolf | G06Q 50/28 |
| 2017/0102467 A1* | 4/2017 | Nielsen | G01S 19/49 |
| 2017/0131711 A1* | 5/2017 | Thomson | G05D 1/0005 |
| 2018/0060764 A1* | 3/2018 | Hance | G06Q 50/28 |
| 2019/0266552 A1* | 8/2019 | Gupta | B65G 1/1371 |

FOREIGN PATENT DOCUMENTS

| | | | |
|---|---|---|---|
| CN | 103870948 | | 6/2014 |
| CN | 104555220 | | 4/2015 |
| CN | 205193590 | | 4/2016 |
| CN | 105593143 | | 5/2016 |
| CN | 105600249 | | 5/2016 |
| CN | 201610939255 | * | 10/2016 |
| JP | H06239422 | | 8/1994 |
| JP | H0797014 | | 4/1995 |
| JP | H10194411 | | 7/1998 |
| JP | 2000255719 | | 9/2000 |
| JP | 2000264408 | | 9/2000 |
| JP | 2000351422 | | 12/2000 |
| JP | 2004359452 | | 12/2004 |
| JP | 2012523358 | | 10/2012 |
| JP | 5116366 | * | 1/2013 |
| JP | 2015005271 | | 1/2015 |
| JP | 2016514661 | | 5/2016 |

OTHER PUBLICATIONS

Chirikjian, Gregory, and M. Ani Hsieh, eds. Distributed autonomous robotic systems. Springer, 2014. (Year: 2014).*
Tan, Ning, Rajesh Elara Mohan, and Akiko Watanabe. "Toward a framework for robot-inclusive environments." Automation in Construction 69 (2016): 68-78. (Year: 2016).*
Bdiwi, Mohamad, and Jozef Suchý. "Storage/retrieval of inaccurately placed objects using robot system and vision/force feedback." International Multi-Conference on Systems, Signals & Devices. IEEE, 2012. (Year: 2012).*
Maka, Aldona, Ratal Cupek, and Marcin Wierzchanowski. "Agent-based modeling for warehouse logistics systems." 2011 UkSim 13th International Conference on Computer Modelling and Simulation. IEEE, 2011. (Year: 2011).*
"Storage and stacking" HKM, Nov. 5, 2015, URL:https://www.hkm.de/fileadmin/Downloads/Download-Seite/Auftragnehmerordnung/Anlage_03_Sicherheitsstandards_fu%CC%88r_Bau-_Montaqe_Demotagestellen_und_IH.pdf. Accessed Apr. 1, 2020 (English translation provided).
Deutsches Institut Für Normung. "Din En 15635:Aug. 2009", Deutsche Norm 2009, 10 pages (English translation provided).
Hompel et al. *Warehouse Management: Automation and Organisation of Warehouse and Order Picking Systems*. Springer, 2006, pp. 26 & 155.
Office Action issued in corresponding European Application No. 17881607.0, dated Apr. 9, 2020.
Ullrich et al. *Automated Guided Vehicle Systems: A Primer with Practical Applications*. Springer, 2014, 234 pages.
International Search Report and Written Opinion issued in Corresponding International Patent Application No. PCT/CN2017/096767, dated Sep. 27, 2017.
Extended European Search Report issued in Corresponding European Patent Application No. 17881607.0, dated Aug. 1, 2019 (6 pages).
Hompel, et al. "Warehouse Management: Automation and Organisation of Warehouse and Order Picking Systems", Springer, Oct. 31, 2006, pp. 2-11, 152-160.
Office Action issued in Corresponding Japanese Application No. 2019-531672, dated Jul. 7, 2020 (English Translation provided).
Office Action issued in Corresponding Chinese Application No. 201611145086.2, dated Mar. 26, 2021 (English Translation provided).
*Research on Intelligent Warehouse Information Management System Based on Internet of Things*. http://www.ixueshu.com, 2014, 80 pages (English Abstract provided).
Office Action issued in Corresponding Chinese Application No. 201611145086.2, dated Sep. 3, 2021 (English Translation provided).
Zaijun, Jiang. *The Study on the Theory and Methodology of Management in National Reserve*. 2007. Wuhan University of Technology, PhD dissertation.

* cited by examiner

MATERIAL ORGANIZATION TASK GENERATION METHOD AND DEVICE, AND MATERIAL ORGANIZATION METHOD AND DEVICE

CROSS-REFERENCE TO RELATED APPLICATIONS

The present application is a national phase under 35 U.S.C. § 371 of International Application No. PCT/CN2017/096767, filed Aug. 10, 2017, which claims priority to Chinese patent application No. 201611145086.2 filed with the China National Intellectual Property Administration on Dec. 13, 2016 and entitled "MATERIAL ORGANIZATION TASK GENERATION METHOD AND DEVICE, AND MATERIAL ORGANIZATION METHOD AND DEVICE", each of which are incorporated herein by reference in their entirety.

TECHNICAL FIELD

The present application relates to the field of automatic logistics technology, and in particular to a method and apparatus for generating a material arrangement task, and a method and apparatus for arranging materials.

BACKGROUND

With the rapid development of e-commerce, requirements of more efficient and faster are put forward for e-commerce logistics management. As an important link in e-commerce logistics management, warehouse management is one of the important factors affecting the efficiency of the e-commerce logistics management. Therefore, how to make the warehouse management more efficient is very important.

One of the main tasks of the warehouse management is material arrangement. Usually, a warehouse includes multiple shelves, each shelf includes multiple storage spaces, each storage space stores multiple materials, and each of the materials is packaged in a packing case with a certain amount and stored in a corresponding storage space. The so-called material arrangement refers to the process of arranging materials among different storage spaces in the target warehouse. These storage spaces can be on the same shelf or on different shelves.

However, in the related art, materials are mainly arranged manually. For example, an operator goes into a warehouse and checks each storage space one by one, and decides which goods in some storage spaces can be arranged into another storage space. In this way, a material arrangement task is manually generated and the operator drives a material handling vehicle or manually moves the material from the source storage space to a target storage space. Obviously, in the related art, the method of manually generating material arrangement tasks and the method of manually arranging materials are inefficient, which seriously affects the efficiency of warehouse management.

SUMMARY

An objective of the embodiments of the present application is to provide a method and an apparatus for generating a material arrangement task, so as to improve the efficiency of material arrangement, thereby improving the efficiency of warehouse management. At the same time, another objective of the embodiments of the present application is further to provide a method and apparatus for arranging a material, so as to improve the efficiency of material arrangement, thereby improving the efficiency of warehouse management.

A method for generating a material arrangement task provided by an embodiment of the present application includes:

receiving a target area arrangement instruction for a target warehouse, wherein the instruction includes at least one shelf number;

classifying a storage space corresponding to each shelf number in the instruction into a destination storage space set or a source storage space set according to pre-stored inventory information of the target warehouse;

determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

Optionally, the step of classifying a storage space corresponding to each shelf number in the instruction into a destination storage space set or a source storage space set includes:

selecting, from the instruction, a shelf number of a shelf with a total weight not greater than a maximum load capacity of a robot;

classifying a storage space corresponding to each selected shelf number into the destination storage space set and the source storage space set.

Optionally, before the step of determining whether there is at least one packing case within a storage space in the source storage space set which can be moved into a storage space in the destination storage space set, the method further includes:

determining whether a weight of a material stored on a shelf where a destination storage space is located exceeds a fourth threshold, wherein the fourth threshold is not greater than a maximum load capacity of the shelf where the destination storage space is located;

if the fourth threshold is exceeded, deleting the destination storage space from the destination storage space set.

Optionally, the step of classifying a storage space corresponding to each shelf number in the instruction into a destination storage space set or a source storage space set according to pre-stored inventory information of the target warehouse includes:

obtaining, according to the pre-stored inventory information of the target warehouse, a storage space corresponding to each shelf number in the instruction;

determining, according to the inventory information, a volume of a movable inventory of each storage space;

determining whether the volume of the movable inventory of each storage space is not greater than a first threshold; if so, determining the storage space as a source storage space; otherwise, determining the storage space as a destination storage space;

classifying all source storage spaces into the source storage space set, and classifying all destination storage spaces into the destination storage space set.

Optionally, the step of determining whether there is at least one packing case within a storage space in the source storage space set which can be moved into a storage space in the destination storage space set, and if so, generating a material arrangement task includes:

selecting one storage space from the destination storage space set arbitrarily as a first destination storage space, and calculating a remaining volume of the first destination storage space;

determining whether there is a first source storage space in the source storage space set; wherein the first source storage space is of a same storage type as the first destination storage space and there is at least one packing case whose volume is less than the remaining volume in the movable inventory of the first source storage space;

if the first source storage space exists, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

Optionally, the step of determining a volume of each packing case in the movable inventory of the first source storage space according to the inventory information; selecting, from the movable inventory, one or more packing cases with a total volume not greater than the remaining volume includes:

determining, according to the inventory information, a volume and a weight of each packing case in the movable inventory of the first source storage space;

selecting, from the movable inventory of the first source storage space, one or more packing cases with a total volume not greater than the remaining volume and with a total weight not greater than a remaining admissible weight of the first destination storage space.

Optionally, the method further includes:

repeatedly performing the step of selecting one storage space from the destination storage space set arbitrarily as a first destination storage space to the step of generating a material arrangement task, so as to generate multiple material arrangement tasks.

Optionally, before repeatedly performing the step of selecting one storage space from the destination storage space set arbitrarily as a first destination storage space to the step of generating a material arrangement task, the method further includes:

if the first source storage space does not exist, deleting the first destination storage space from the destination storage space set;

determining whether the destination storage space set is empty, and if not, repeatedly performing the step of selecting one storage space from the destination storage space set arbitrarily as a first destination storage space to the step of generating a material arrangement task.

Optionally, before the step of repeatedly performing the step of selecting one storage space from the destination storage space set arbitrarily as a first destination storage space to the step of generating a material arrangement task, the method further includes:

determining whether a difference between the remaining volume of the first destination storage space and a total volume of the packing case to be arranged is less than a third threshold;

if so, deleting the first destination storage space from the destination storage space set, and in a case that the destination storage space set is not empty, repeatedly performing the step of selecting one storage space from the destination storage space set arbitrarily as a first destination storage space to the step of generating a material arrangement task;

otherwise, updating the remaining volume of the first destination storage space according to the difference between the remaining volume and the total volume of the packing case to be arranged, and repeatedly performing the step of determining whether there is a first source storage space in the source storage space set to the step of generating a material arrangement task.

Optionally, before repeatedly performing the step of selecting one storage space from the destination storage space set arbitrarily as a first destination storage space to the step of generating a material arrangement task, the method further includes:

determining whether there is any remaining movable inventory in the first source storage space;

if so, repeatedly performing the step of selecting one storage space from the destination storage space set arbitrarily as a first destination storage space to the step of generating a material arrangement task;

otherwise, deleting the first source storage space from the source storage space set, and in a case that the source storage space set is not empty, repeatedly performing the step of selecting one storage space from the destination storage space set arbitrarily as a first destination storage space to the step of generating a material arrangement task.

Optionally, the method further includes:

merging multiple material arrangement tasks with a same shelf number corresponding to the source storage space and a same shelf number corresponding to the destination storage space into a same material arrangement task;

alternatively, merging multiple material arrangement tasks with a same shelf number corresponding to the source storage space into a same material arrangement task;

alternatively, merging multiple material arrangement tasks with a same shelf number corresponding to the destination storage space into a same material arrangement task.

Optionally, the movable inventory refers to an inventory that meets a first preset condition; wherein the first preset condition includes one or a combination of: a storage space storing the inventory not being locked up, no stocktake being performed for the storage space, no material stored on the storage space being transported out of the warehouse, no material stored on the storage space being transported into the warehouse, and the inventory stored in the storage space being available.

A method for arranging a material provided by an embodiment of the present application includes:

obtaining a material arrangement task generated by any embodiment of the present application;

generating a scheduling instruction for scheduling at least one robot according to the shelf number included in the material arrangement task;

sending the scheduling instruction carrying the shelf number to the at least one robot, so as to cause the at least one robot to transport a shelf corresponding to the shelf number to a preset position;

when a second preset condition is satisfied, sending a return instruction to the at least one robot, so as to cause the at least one robot to transport the shelf corresponding to the shelf number to an initial position.

Optionally, the second preset condition is that:

stay time of the at least one robot in the preset position exceeds a fifth threshold; or, a preset instruction is received.

An apparatus for generating a material arrangement task provided by an embodiment of the present application includes:

an instruction receiving module, configured for receiving a target area arrangement instruction for a target warehouse, wherein the instruction includes at least one shelf number;

a storage space classifying module, configured for classifying a storage space corresponding to each shelf number in the instruction into a destination storage space set or a source storage space set according to pre-stored inventory information of the target warehouse;

a first determining module, configured for determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

Optionally, the storage space classifying module is specifically configured for selecting, from the instruction, a shelf number of a shelf with a total weight not greater than a maximum load capacity of a robot, and classifying a storage space corresponding to each selected shelf number into the destination storage space set and the source storage space set.

Optionally, the apparatus further includes a second determining module and a first deleting module.

The second determining module is configured for determining, before triggering the first determining module, whether a weight of a material stored on a shelf where a destination storage space is located exceeds a fourth threshold, wherein the fourth threshold is not greater than a maximum load capacity of the shelf where the destination storage space is located.

The first deleting module is configured for deleting the destination storage space from the destination storage space set and triggering the first determining module when a determination result obtained by the second determining module is YES.

Optionally, the storage space classifying module includes:

a storage space obtaining sub-module, configured for obtaining, according to the pre-stored inventory information of the target warehouse, a storage space corresponding to each shelf number in the instruction;

a determining sub-module, configured for determining a volume of a movable inventory of each storage space according to the inventory information;

a first determining sub-module, configured for determining whether the volume of the movable inventory of each storage space is not greater than a first threshold; if so, the storage space is determined as a source storage space; otherwise, the storage space is determined as a destination storage space;

a classifying sub-module, configured for classifying all source storage spaces into the source storage space set, and classifying all destination storage spaces into the destination storage space set.

Optionally, the first determining module includes a selecting sub-module, a second determining sub-module, and an arrangement task generating sub-module.

The selecting sub-module is configured for selecting one storage space from the destination storage space set arbitrarily as a first destination storage space, and calculating a remaining volume of the first destination storage space.

The second determining sub-module is configured for determining whether there is a first source storage space in the source storage space set; wherein the first source storage space is of a same storage type as the first destination storage space and there is at least one packing case whose volume is less than the remaining volume in the movable inventory of the first source storage space.

The arrangement task generating sub-module is configured for determining, in a case that a determination result obtained by the second determining sub-module is YES, a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

Optionally, the arrangement task generating sub-module is specifically configured for determining, according to the inventory information, a volume and a weight of each packing case in the movable inventory of the first source storage space; selecting, from the movable inventory of the first source storage space, one or more packing cases with a total volume not greater than the remaining volume and with a total weight not greater than the remaining admissible weight of the first destination storage space.

Optionally, the apparatus further includes:

a first triggering module, configured for repeatedly triggering the selecting sub-module, the second determining sub-module, and the arrangement task generating sub-module so as to generate multiple material arrangement tasks.

Optionally, the first determining module further includes a first deleting sub-module, configured for deleting the first destination storage space from the destination storage space set when a determination result obtained by the second determining sub-module is NO.

The apparatus further includes a third determining module, configured for determining whether the destination storage space set is empty, and if not, triggering the first triggering module.

Optionally, the apparatus further includes:

a fourth determining module, configured for determining, before triggering the first triggering module, whether a difference between the remaining volume of the first destination storage space and a total volume of the packing case to be arranged is less than a third threshold;

a second deleting module, configured for deleting the first destination storage space from the destination storage space set when a determination result obtained by the fourth determining module is YES;

a fifth determining module, configured for determining whether the destination storage space set is empty, and if not, triggering the first triggering module;

an update module, configured for updating the remaining volume of the first destination storage space according to the difference between the remaining volume and the total volume of the packing case to be arranged if a determination result obtained by the fourth determining module is NO, and triggering the second determining sub-module.

Optionally, the apparatus further includes a sixth determining module, a third deleting module, and a seventh determining module.

The sixth determining module is configured for determining whether there is any remaining movable inventory in the first source storage space before triggering the first triggering module; if so, triggering the first triggering module; otherwise, triggering the third deleting module.

The third deleting module is configured for deleting the first source storage space from the source storage space set.

The seventh determining module is configured for determining whether the source storage space set is empty; if not, triggering the first triggering module.

Optionally, the apparatus further includes a merging module.

The merging module is configured for merging multiple material arrangement tasks with a same shelf number corresponding to the source storage space and a same shelf number corresponding to the destination storage space into a same material arrangement task.

Alternatively, the merging module is configured for merging multiple material arrangement tasks with a same shelf number corresponding to the source storage space into a same material arrangement task.

Alternatively, the merging module is configured for merging multiple material arrangement tasks with a same shelf number corresponding to the destination storage space into a same material arrangement task.

Optionally, the movable inventory refers to an inventory that meets a first preset condition; wherein the first preset condition includes one or a combination of: a storage space storing the inventory not being locked up, no stocktake being performed for the storage space, no material stored on the storage space being transported out of the warehouse, no material stored on the storage space being transported into the warehouse, and the inventory stored in the storage space being available.

An apparatus for arranging a material provided by an embodiment of the present application includes:

a material arrangement task obtaining module, configured for obtaining a material arrangement task generated by any embodiment of the present application;

a scheduling instruction generating module, configured for generating a scheduling instruction for scheduling at least one robot according to the shelf number included in the material arrangement task;

a scheduling instruction sending module, configured for sending the scheduling instruction carrying the shelf number to the at least one robot, so as to cause the at least one robot to transport a shelf corresponding to the shelf number to a preset position;

a return instruction sending module, configured for sending a return instruction to the at least one robot, so as to cause the at least one robot to transport a shelf corresponding to the shelf number to an initial position when a second preset condition is satisfied.

Optionally, the second preset condition is that:

stay time of the at least one robot in the preset position exceeds a fifth threshold; or, a preset instruction is received.

An application program provided by an embodiment of the present application is configured for performing the method for generating a material arrangement task or the method for arranging a material when being executed.

A storage medium provided by an embodiment of the present application is configured for storing an application program, wherein the application program is used to perform the method for generating a material arrangement task or the method for arranging a material when being executed.

An electronic device provided by an embodiment of the present application includes a processor and a memory, wherein the processor executes a program corresponding to executable program code by reading the executable program code stored in the memory, so as to perform the method for generating a material arrangement task or the method for arranging a material.

The method and apparatus for generating a material arrangement task provided by the embodiments of the present application can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

For the method and apparatus for arranging a material provided by the embodiments of the present application, on the one hand, a material arrangement task is generated by adopting the method for generating a material arrangement task provided by the embodiment of the present application; on the other hand, a robot is used for shelf transportation to complete the material arrangement. Therefore, compared with the related art, the time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION OF THE INVENTION

The technical solutions in the embodiments of the present application will be clearly and completely described in the following with reference to the drawings of the embodiments of the present application. It is obvious that the described embodiments are only a part of the embodiments of the present application, and not all of the embodiments. All other embodiments obtained by a person of ordinary skill in the art based on the embodiments of the present application without any creative efforts fall within the protection scope of the present application.

In order to solve the problems in the related art, an embodiment of the present application provides a method and apparatus for generating a material arrangement task, and a method and apparatus for arranging a material.

A method for generating a material arrangement task provided by the embodiment of the present application is first described below.

Figure 1:
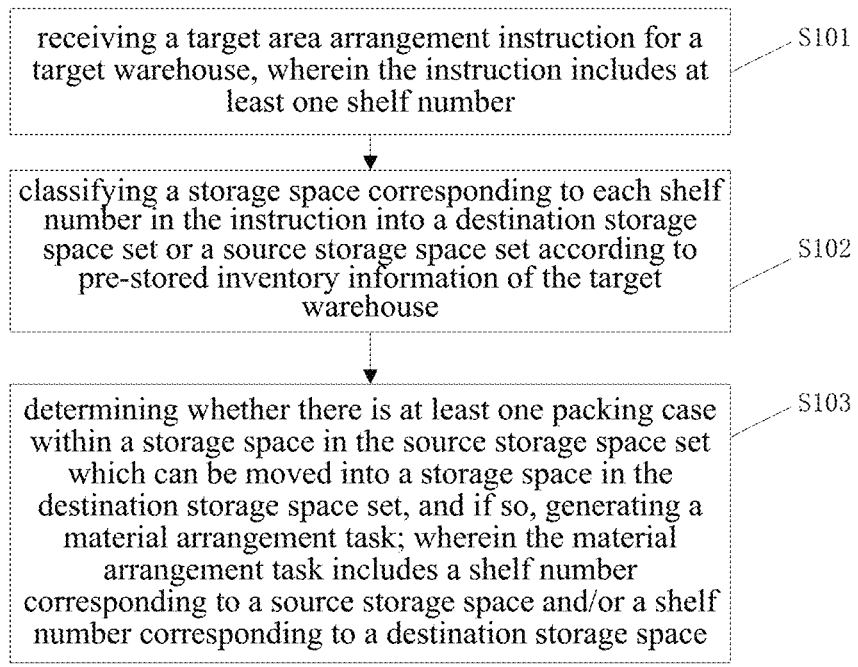
FIG. 1 is a flowchart of a method for generating a material arrangement task provided by an embodiment of the present application.

FIG. 1 shows a flowchart of the method for generating a material arrangement task provided by the embodiment of the present application. As shown in FIG. 1, the method includes steps S101 to S103.

S101, receiving a target area arrangement instruction for a target warehouse, wherein the instruction includes at least one shelf number.

In the embodiment of the present application, an information database of a target warehouse may be pre-established. The information database stores information of the target warehouse, such as inventory information and warehouse's map. The map of the target warehouse displays location information of each shelf in the target warehouse, after clicking on any shelf in the map, corresponding shelf information and storage space information of a storage space on the shelf can be obtained. The shelf information includes a shelf number, storage space information of each storage space on the shelf, and the like. The storage space information includes a storage space number, a storage space volume, a storage type of a storage space, and inventory information of the material stored in a storage space.

The inventory information includes a material number, a material name, a material quantity, a material batch number, a storage space number of a storage space where the material is located, a shelf number of a shelf where the material is located, a volume of a material packing case, a weight of the material, and a quantity of the material that can be stored in one packing case.

Specifically, receiving the target area arrangement instruction for the target warehouse may include the following two methods.

Method 1: receiving an input instruction input by the user, which includes at least one shelf number.

Method 2: receiving a selection instruction indicating that the user selects at least one shelf in the map of the target warehouse, wherein the selection instruction includes the shelf number of the selected shelf.

In practical applications, an intelligent management system of a target warehouse can be maintained, through which all information in the pre-established information database can be accessed, and the user can input at least one shelf number through the operating interface of the system. Likewise, the user can access the map of the target warehouse through the intelligent management system, and then selects at least one shelf on the map for generating a material arrangement task.

Figure 2:
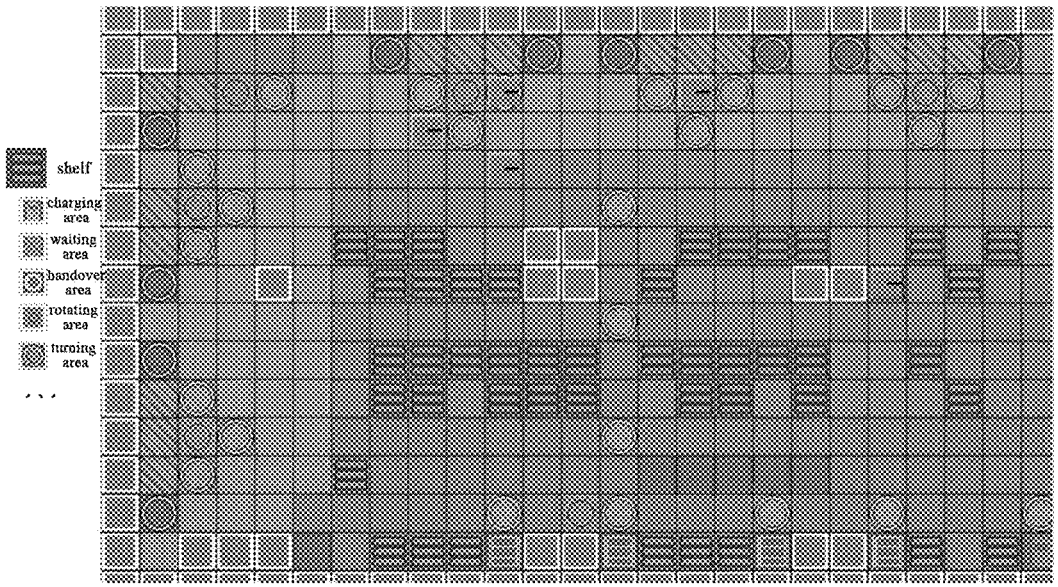
FIG. 2 is a schematic diagram of a map of a target warehouse.

FIG. 2 shows a schematic diagram of a map of a target warehouse. In FIG. 2, the warehouse's map is divided by grids. One grid represents a storage location, and one storage location can only correspond to one shelf. Of course, not every storage location is provided with a shelf correspondingly. Since the shelf is transported by a robot in this embodiment, in the warehouse's map shown in FIG. 2, spaces for charging a robot, spaces for a robot to wait in a line, spaces for a robot to rotate, spaces for a robot to turn and spaces for a robot to walk are reserved, and these spaces along with the shelves are marked with different graphics. The specific meanings of the different graphics are shown in FIG. 2.

It should be noted that the warehouse's map shown in FIG. 2 is only an example of a warehouse's map, and the meaning represented by the graphic is only an example. A warehouse's map can be specifically set according to actual conditions in practical applications, and is not limited to the example shown in FIG. 2.

S102, classifying a storage space corresponding to each shelf number in the instruction into a destination storage space set or a source storage space set according to pre-stored inventory information of the target warehouse.

In a specific implementation of the embodiment of the present application, step S102 may specifically include the following steps 1 to 3.

Step 1, obtaining, according to the shelf information stored in the information database of the target warehouse, a storage space corresponding to each shelf number in the instruction.

Step 2, determining, according to the inventory information, a volume of a movable inventory of each storage space.

Step 3, determining whether the volume of the movable inventory of each storage space is not greater than a first threshold; if yes, determining the storage space as a source storage space; if not, determining the storage space as a destination storage space.

The first threshold is a product of a second threshold and a volume of a storage space; the second threshold is a value set by the warehouse manager according to the volume of the storage space, the type of the material stored in the storage space and experiences, and the second threshold is in the range of [0,1].

The movable inventory refers to an inventory that meets a first preset condition; wherein the first preset condition includes one or a combination of: the storage space that stores the inventory not being locked up, no stocktake being performed for the storage space, no material stored on the storage space being transported out of the warehouse, no material stored on the storage space being transported into the warehouse, and the material stored in the storage space being available.

It can be seen that, in the embodiment of the present application, since the material arrangement task is generated only for a storage space in which the movable inventory exists, the influence of the material arrangement operation on other warehouse management work can be well avoided.

Step 4, classifying all source storage spaces into the source storage space set, and classifying all destination storage spaces into the destination storage space set.

In another specific implementation of the embodiment of the present application, in step S102, the step of classifying a storage space corresponding to each shelf number in the instruction into a destination storage space set or a source storage space set may include:

selecting, from the instruction, a shelf number of a shelf with a total weight not greater than a maximum load capacity of a robot; and classifying the storage space corresponding to each selected shelf number into the destination storage space set and the source storage space set.

Since a shelf handling robot is used to carry the shelves for material arrangement in the embodiment of the present application, when a material arrangement task is generated, if the maximum load capacity of the robot is considered, the service life of the robot can be ensured without being damaged.

S103, determining whether there is at least one packing case within a storage space in the source storage space set which can be moved into a storage space in the destination storage space set, and if so, generating a material arrangement task.

The material arrangement task includes a shelf number corresponding to a source storage space and/or a shelf number corresponding to a destination storage space. In the embodiment of the present application, a shelf number corresponding to a source storage space is referred to as a source shelf number, and a shelf number corresponding to a destination storage space is referred to as a destination shelf number.

The material arrangement task may further include at least one of the followings: a source storage space number, a destination storage space number, a number of the material to be arranged, a quantity of the packing case for the material to be arranged, a name of the material to be arranged, a batch number of the material to be arranged, and a manufacturer of the material to be arranged, description information of the material to be arranged, a currently available stock of the material to be arranged, a special stock identifier of the material to be arranged, a creator of the material arrangement task, and creation time of the material arrangement task.

It is not difficult to understand that materials stored in a packing case to be arranged are the materials to be arranged, and the arrangement for the packing case to be arranged is the arrangement for the materials to be arranged.

Figure 3:
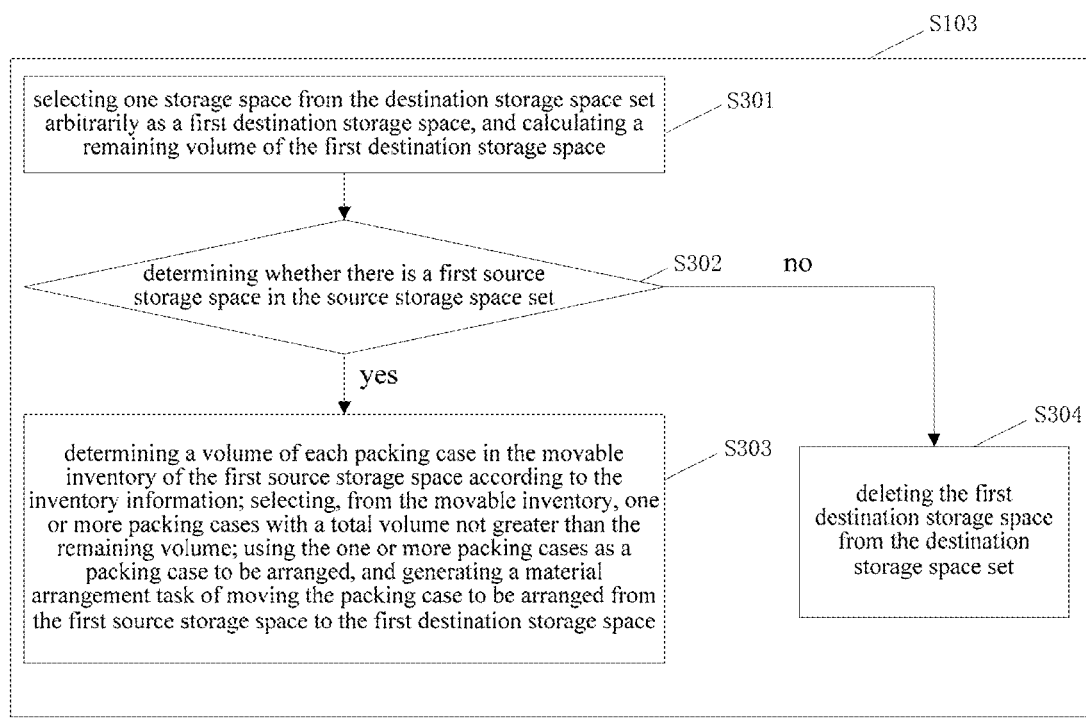
FIG. 3 is a specific flowchart of S103 in FIG. 1.

In a specific implementation of the embodiment of the present application, as shown in FIG. 3, step S103 may specifically include the following steps.

S301, selecting one storage space from the destination storage space set arbitrarily as a first destination storage space, and calculating a remaining volume of the first destination storage space.

Specifically, the volume of the first destination storage space and the volume of the material stored in the first destination storage space are determined according to the shelf information stored in the pre-established information database, and the difference between the two is calculated to obtain the remaining volume of the first destination storage space.

S302, determining whether there is a first source storage space in the source storage space set; if the first source storage space exists, performing Step S303; optionally, if the first source storage space does not exist, performing Step S304.

Herein, the first source storage space is of a same storage type as the first destination storage space and there is at least one packing case whose volume is less than the remaining volume in the movable inventory of the first source storage space.

The storage type generally refers to a type of material that the storage space can store. For example, a storage type of a storage space is a button cell type.

Specifically, the movable inventory of the first source storage space and the volume of each packing case in the movable inventory are determined according to the pre-stored inventory information.

In this embodiment, optionally, the volume of the first source storage space and the first destination storage space are also the same.

S303, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

Since the pre-stored inventory information includes the volume of the packing case for materials, the volume of each packing case in the movable inventory of the first source storage space may be determined according to the inventory information, and multiple packing cases with a total volume not greater than the remaining volume can be selected therefrom.

It can be understood that the multiple packing cases may be exactly all the packing cases in the movable inventory in the first source storage space, or may be several packing cases in the movable inventory in the first source storage space, or even just one packing case, which is all reasonable.

In a specific implementation of the embodiment of the present application, in order to ensure that the service life of the first destination storage space is not damaged, optionally, in Step S303, the step of determining a volume of each packing case in the movable inventory of the first source storage space according to the inventory information; and selecting, from the movable inventory, one or more packing cases with a total volume not greater than the remaining volume may include:

determining, according to the inventory information stored in the information database, a volume and a weight of each packing case in the movable inventory of the first source storage space;

selecting, from the movable inventory of the first source storage space, one or more packing cases with a total volume not greater than the remaining volume and with a total weight not greater than a remaining admissible weight of the first destination storage space.

S304, deleting the first destination storage space from the destination storage space set.

If there is no first source storage space in the source storage space set, it means that there is no material in the source storage space set that can be arranged to the first destination storage space. Therefore, the first destination storage space needs to be deleted from the destination storage space set to avoid repeated execution of Step S302 for the first destination storage space, and thereby avoid wasting resources.

The method for generating a material arrangement task provided by the present embodiment can automatically generate a material arrangement task after receiving a target area arrangement instruction based on the pre-stored inventory information, without checking each storage space one by one in the warehouse by an operator manually to generate a material arrangement task. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Optionally, before the step S103 is performed, that is, before the step of determining whether there is at least one packing case within a storage space in the source storage space set which can be moved into a storage space in the destination storage space set, the method for generating a material arrangement task provided by the embodiment of the present application may further include the following steps:

determining whether a weight of a material stored on a shelf where a destination storage space is located exceeds a fourth threshold, if the fourth threshold is exceeded, deleting the destination storage space from the destination storage space set.

The fourth threshold is not greater than a maximum load capacity of the shelf where the destination storage space is located.

It can be seen that, in the embodiment, when a material arrangement task is generated, the maximum load capacity of the shelf where the destination storage space is located is also considered. When the weight of the stored material of the shelf where the target storage space is located exceeds the fourth threshold, materials are not placed in the destination storage space anymore to avoid damage to the service life of the shelf where the destination storage space is located.

Optionally, the method for generating a material arrangement task provided by the embodiment of the present application may further include the following steps: repeatedly performing step S103 to generate multiple material arrangement tasks.

Specifically, in a specific implementation of the embodiment of the present application, as shown in FIG. 3, when step S103 includes steps S301 to S303, the steps S301 to S303 are repeatedly performed to generate multiple material arrangement tasks. That is, the step of selecting one storage space from the destination storage space set arbitrarily as a first destination storage space to the step of generating a material arrangement task are repeatedly performed, so as to generate multiple material arrangement tasks.

Specifically, in another specific implementation of the embodiment of the present application, as shown in FIG. 3, when step S103 includes step S304, it is first determined whether the destination storage space set is empty, and if not, repeatedly performing steps S301 to S303. In other words, the step of selecting one storage space from the destination storage space set arbitrarily as a first destination storage space to the step of generating a material arrangement task are repeatedly performed, so as to generate multiple material arrangement tasks; if yes, ending the process.

It can be understood that the steps S301 to S304 are repeatedly executed until the destination storage space set is empty, which means that there is no destination storage space in the target area that can receive the materials to be arranged, and the material arrangement tasks for the target area are all generated, and the process can be ended.

Figure 4:
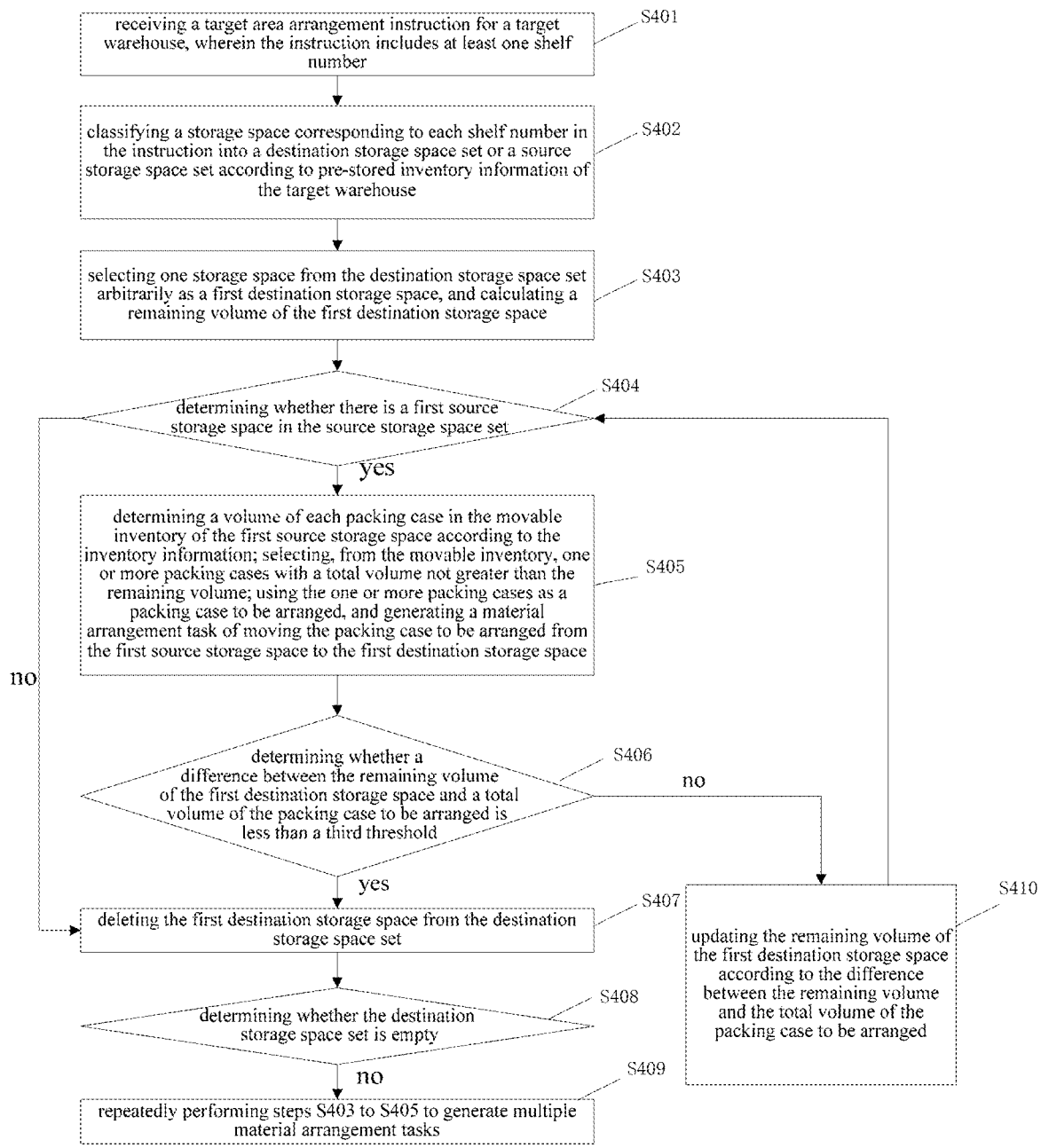
FIG. 4 is a flowchart of another method for generating a material arrangement task provided by an embodiment of the present application.

FIG. 4 shows a flowchart of another method for generating a material arrangement task provided by an embodiment of the present application. As shown in FIG. 4, the method includes steps S401 to S410.

S401, receiving a target area arrangement instruction for a target warehouse, wherein the instruction includes at least one shelf number.

S402, classifying a storage space corresponding to each shelf number in the instruction into a destination storage space set or a source storage space set according to pre-stored inventory information of the target warehouse.

It should be noted that step S401 and step S402 is consistent with step S101 and step S102 in FIG. 1 respectively, which will not be repeated here.

S403, selecting one storage space from the destination storage space set arbitrarily as a first destination storage space, and calculating a remaining volume of the first destination storage space.

S404, determining whether there is a first source storage space in the source storage space set; if the first source storage space exists, performing step S405, if the first source storage space does not exist, performing step S407.

The first source storage space is of a same storage type as the first destination storage space and there is at least one packing case whose volume is less than the remaining volume in the movable inventory of the first source storage space.

S405, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

It should be noted that steps S403, S404, S405, and S407 are the same as steps S301 to S304 shown in FIG. 3 respectively, and therefore, steps S403, S404, S405, and S407 will not be described in details in this embodiment.

S406, determining whether a difference between the remaining volume of the first destination storage space and a total volume of the packing case to be arranged is less than a third threshold; if yes, performing step S407; otherwise, performing step S410.

The third threshold is set according to the storage type of the destination storage space. Generally, the third threshold is a volume of the smallest packing case for the material that can be stored in the storage space, and may of course be set according to experiences.

S407, deleting the first destination storage space from the destination storage space set.

S408, determining whether the destination storage space set is empty, if yes, ending the process; otherwise, performing step S409.

When the destination storage space set is empty, it means it is no longer necessary to arrange the target area. Therefore, only if the destination storage space set is not empty, it is necessary to further perform step S409 to generate multiple material arrangement tasks.

S409, repeatedly performing steps S403 to S405 to generate multiple material arrangement tasks.

S410, updating the remaining volume of the first destination storage space according to the difference between the remaining volume and the total volume of the packing case to be arranged, and repeatedly performing steps S404 to S405.

Specifically, the remaining volume of the first destination storage space is updated to be the difference between the value of the remaining volume obtained by calculation in step S403 and the total volume of the packing case to be arranged determined in step S405.

The method for generating a material arrangement task provided by the embodiments of the present application can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Figure 5:
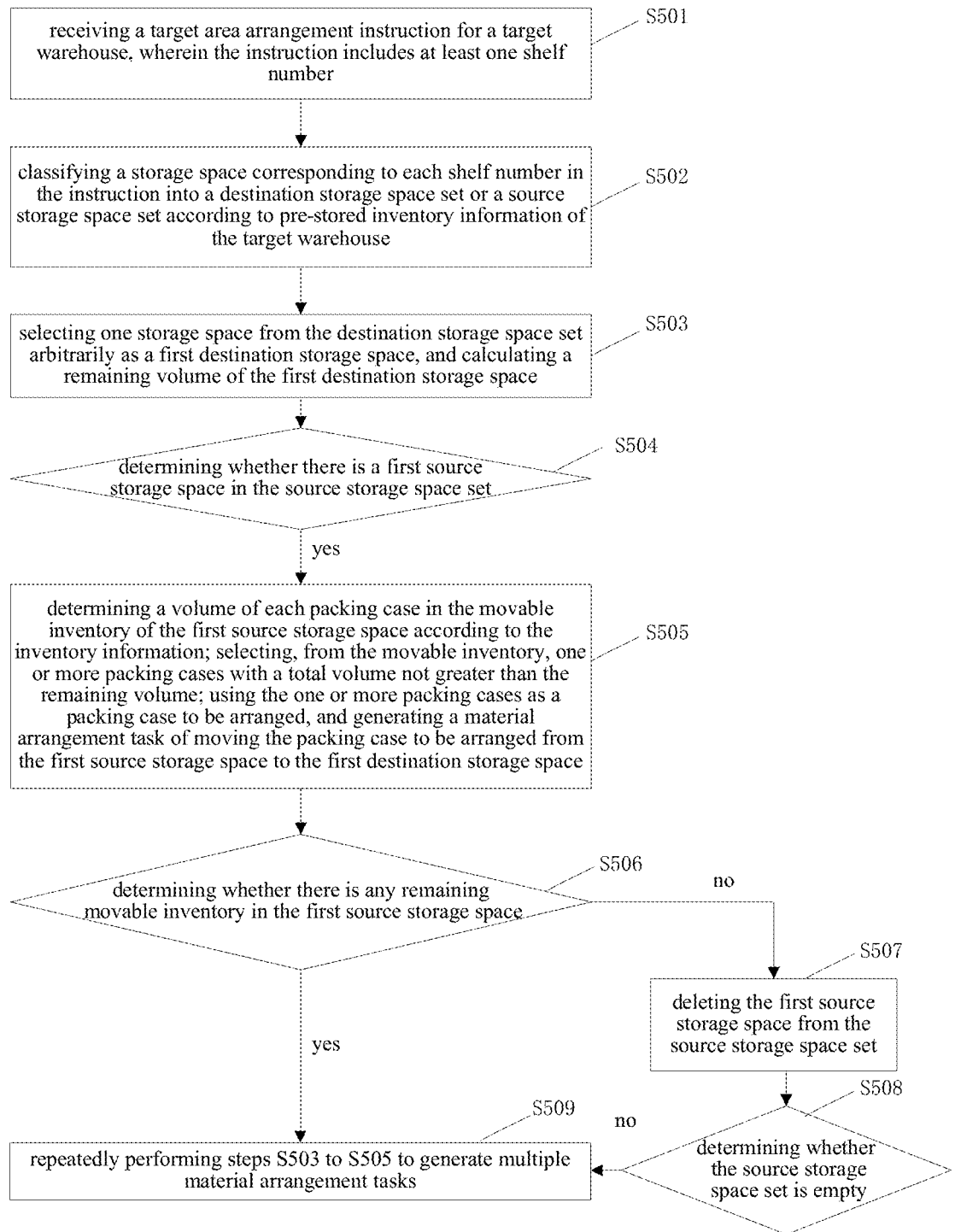
FIG. 5 is a flowchart of another method for generating a material arrangement task provided by an embodiment of the present application.

FIG. 5 shows a flowchart of another method for generating a material arrangement task according to an embodiment of the present application. As shown in FIG. 5, the method includes steps S501 to S509.

The steps S501 to S505 are the same as the steps S401 to S405 shown in FIG. 4 respectively, which will not be described here.

S506, determining whether there is any remaining movable inventory in the first source storage space; if not, performing step S507; if so, performing step S509.

S507, deleting the first source storage space from the source storage space set, and turning to step S508.

S508, determining whether the source storage space set is empty, if not, performing step S509; if so, ending the process.

When the source storage space set is empty, it means there is no material needed to be arranged in the target area. Therefore, only if the source storage space set is not empty, it is necessary to further repeatedly perform steps S503 to S505.

S509, repeatedly performing steps S503 to S505 to generate multiple material arrangement tasks.

The method for generating a material arrangement task provided by the embodiment can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Optionally, the method for generating a material arrangement task provided by the embodiments of the present application may further include the following steps:

merging multiple material arrangement tasks with a same shelf number corresponding to the source storage space and a same shelf number corresponding to the destination storage space into a same material arrangement task;

alternatively, merging multiple material arrangement tasks with a same shelf number corresponding to the source storage space into a same material arrangement task;

alternatively, merging multiple material arrangement tasks with a same shelf number corresponding to the destination storage space into a same material arrangement task.

It can be understood that, in the actual applications there may be cases where materials on the same source storage space are arranged into different destination storage spaces located on different shelves, or a same destination storage space located on a same shelf receives materials from the source storage spaces from different shelves. Therefore, there can be multiple material arrangement tasks generated by the method for generating a material arrangement task provided by the embodiment of the present application.

Of course, it is also possible to merge all the material arrangement tasks into a same material arrangement task, and only one material arrangement task is generated.

It is not difficult to understand that since the embodiments of the present application use a robot to perform material arrangement, after merging the material arrangement tasks with a same shelf number corresponding to the source storage space and/or a same shelf number corresponding to the destination storage space, the robot can fulfil more material arrangement tasks when carrying the shelf once, and thus avoiding the waste of resources caused by the robot carrying the same shelf repeatedly.

A method for arranging a material provided by an embodiment of the present application is described below.

Figure 6:
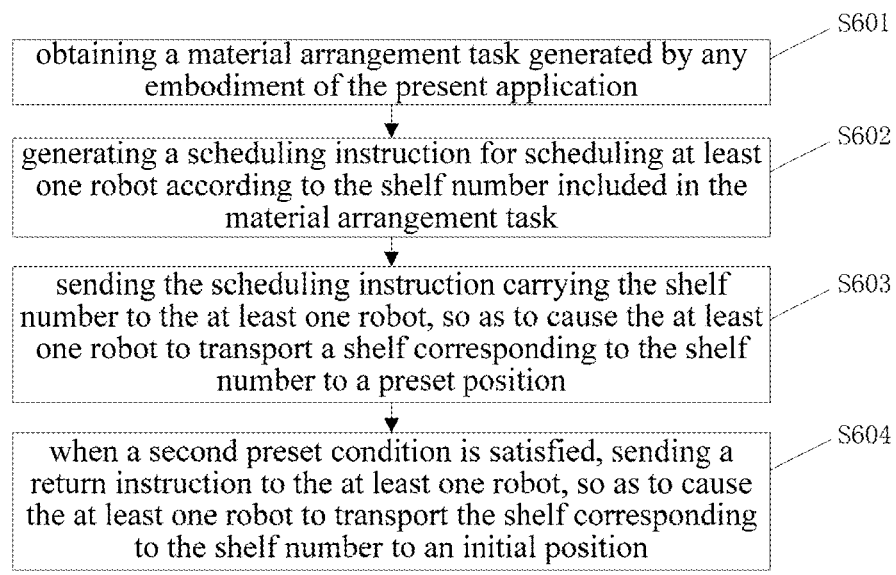
FIG. 6 is a flowchart of a method for arranging a material provided by an embodiment of the present application.

FIG. 6 shows a flowchart of a method for arranging a material provided by an embodiment of the present application. As shown in FIG. 6, the method includes steps S601 to S604.

S601, obtaining a material arrangement task generated by any embodiment of the present application.

S602, generating a scheduling instruction for scheduling at least one robot according to the shelf number included in the material arrangement task.

In the embodiment of the present application, since one robot can only carry one shelf at a time, a plurality of scheduling instructions corresponding to the shelf number can be generated.

Since there may be more than one material arrangement task, the material arrangement task that actually needs to be done is determined first. The material arrangement task carries all the information of the material to be arranged, and the material arrangement task is sent to a robot management system. The robot management system analyses the material arrangement task to generate a scheduling instruction, and transmits the scheduling instruction to at least one robot.

S603, sending the scheduling instruction carrying the shelf number to the at least one robot, so as to cause the at least one robot to transport a shelf corresponding to the shelf number to a preset position.

The generated scheduling instructions may be first ordered in a certain sequence. After ordering, the scheduling instructions are sequentially sent to a corresponding robot according to the number of robots, so that the robots execute the current scheduling instructions in sequence, and then execute a next scheduling instruction.

The preset position is a specified position in the target warehouse, and in the actual application, the preset position is a workbench. The workbench is a platform for operators to pick up goods and inquire material arrangement tasks.

S604, when a second preset condition is satisfied, sending a return instruction to the at least one robot, so as to cause the at least one robot to transport the shelf corresponding to the shelf number to an initial position.

The second preset condition is that the stay time of the at least one robot in the preset position exceeds a fifth threshold; or a preset instruction is received.

Specifically, in a case that the stay time of the at least one robot in the preset position exceeds a preset value, a return instruction is sent to the at least one robot. Alternatively, in a case where a preset instruction is received, a return instruction is sent to the at least one robot. For example, the preset instruction may be an instruction indicating the completion of the picking up sent by the operator at the workbench, wherein the picking up refers to the process of placing the material to be arranged in the source storage space into the destination storage space according to the material arrangement task.

The initial position is the original position of the shelf in the target warehouse.

Figure 7:
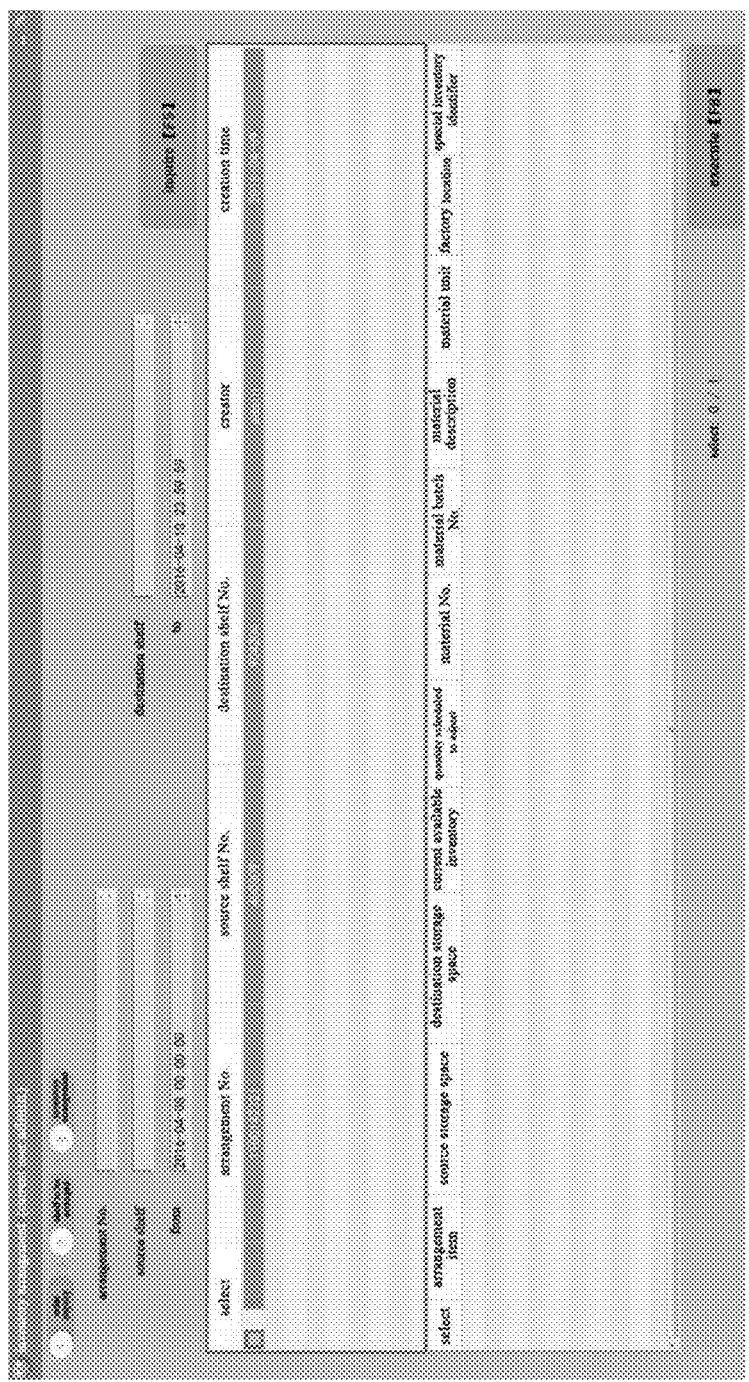
FIG. 7 is a schematic diagram of an interface for inquiring a material arrangement task.

In practical applications, a user can inquire the material arrangement task through the workbench. FIG. 7 shows an inquiry interface at a workbench to inquire a material arrangement task in the actual application. Through the inquiry interface in FIG. 7, an operator can get to know information such as the material arrangement task number, source shelf number, destination shelf number, source storage space, destination storage space, material number, etc. The operator selects an arrangement task item (a material arrangement task), and clicks the "execute" button to jump to the picking up interface, the picking up interface is shown in FIG. 8.

Figure 8:
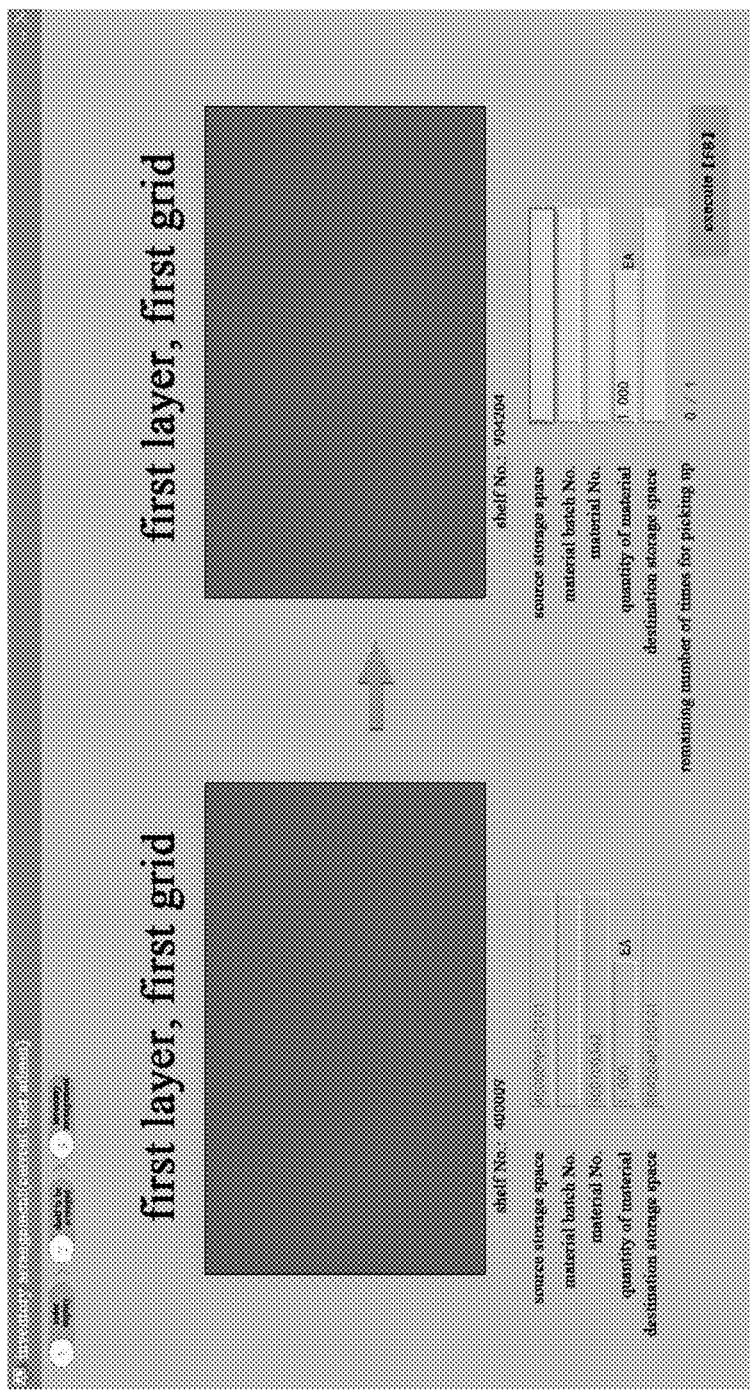
FIG. 8 is a schematic diagram of an interface for picking up goods.

When the operator completes the actual picking up operation, clicks the "execute" button in FIG. 8, the entire picking up operation is completed. At this time, a return instruction is sent to the robot, and the robot automatically transports the shelf corresponding to the shelf number to the initial position.

Optionally, the scheduling instruction further carries a moving path of the robot, where the moving path is determined according to a map of the target warehouse and a position of the carried shelf on the warehouse's map.

In the method for arranging a material provided by the embodiment of the present application, on the one hand, a material arrangement task is generated by applying the method for generating a material arrangement task provided by the embodiment of the present application; on the other hand, a robot is used for shelf transportation to complete the material arrangement. Therefore, compared with the related art, time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

An apparatus for generating a material arrangement task provided by an embodiment of the present application is described below.

Figure 9:
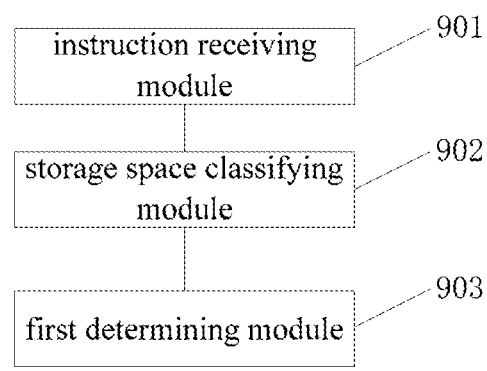
FIG. 9 is a structural block diagram of an apparatus for generating a material arrangement task provided by an embodiment of the present application.

FIG. 9 shows a structural block diagram of an apparatus for generating a material arrangement task according to an embodiment of the present application. As shown in FIG. 9, the apparatus includes an instruction receiving module 901, a storage space classifying module 902, and a first determining module 903.

The instruction receiving module 901 is configured for receiving a target area arrangement instruction for a target warehouse, wherein the instruction includes at least one shelf number.

In the embodiment of the present application, an information database of a target warehouse may be pre-established. The information database stores information of the target warehouse, such as inventory information and warehouse's maps. The map of the target warehouse displays location information of each shelf in the target warehouse, after clicking on any shelf in the map, the corresponding shelf information and storage space information of a storage space on the shelf can be obtained. The shelf information includes a shelf number, storage space information of each storage space on the shelf, and the like. The storage space information includes a storage space number, a storage space volume, a storage type of a storage space, and inventory information of the material stored in a storage space.

The inventory information includes a material number, a material name, a material quantity, a material batch number, a storage space number of a storage space where the material is located, a shelf number of a shelf where the material is located, a volume of a material packing case, a weight of the material, and a quantity of the material that can be stored in one packing case.

Specifically, receiving the target area arrangement instruction by the instruction receiving module 901 may include the following two methods.

Method 1: receiving an input instruction input by the user, which includes at least one shelf number;

Method 2: receiving a selection instruction indicating that the user selects at least one shelf in the map of the target warehouse, wherein the selection instruction includes the shelf number of the selected shelf.

The storage space classifying module 902 is configured for classifying a storage space corresponding to each shelf number in the instruction into a destination storage space set or a source storage space set according to pre-stored inventory information of the target warehouse.

In a specific implementation provide by the embodiment of the present application, the storage space classifying module 902 includes a storage space obtaining sub-module, a determining sub-module, a first determining sub-module and a classifying sub-module.

The storage space obtaining sub-module is configured for obtaining, according to the shelf information stored in the information database of the target warehouse, a storage space corresponding to each shelf number in the instruction.

The determining sub-module is configured for determining a volume of a movable inventory of each storage space according to the inventory information.

The first determining sub-module is configured for determining whether the volume of the movable inventory of each storage space is not greater than a first threshold; if yes, determining the storage space as a source storage space; otherwise, determining the storage space as a destination storage space.

The first threshold is a product of a second threshold and a volume of a storage space; the second threshold is a value set by the warehouse manager according to the volume of the storage space, the type of the material stored in the storage space and experiences, and the second threshold is in the range of [0,1].

The movable inventory refers to an inventory that meets a first preset condition; wherein the first preset condition includes one or a combination of: the storage space that stores the inventory not being locked up, no stocktake being performed for the storage space, no material stored on the storage space being transported out of the warehouse, no material stored on the storage space being transported into the warehouse, and the material stored in the storage space being available.

It can be seen that, in the embodiment of the present application, since the material arrangement task is generated only for a storage space in which the movable inventory exists, the influence of the material arrangement operation on other warehouse management work can be well avoided.

The classifying sub-module is configured for classifying all source storage spaces into the source storage space set, and classifying all destination storage spaces into the destination storage space set.

In another specific implementation provide by the embodiment of the present application, the classifying module 902 is specifically configured for selecting, from the instruction, a shelf number of a shelf with a total weight not greater than a maximum load capacity of a robot; and classifying the storage space corresponding to each selected shelf number into the destination storage space set and the source storage space set.

Since a shelf handling robot is used to carry the shelves for material arrangement in the embodiment of the present application, when a material arrangement task is generated, if the maximum load capacity of the robot is considered, the service life of the robot can be ensured without being damaged.

The first determining module 903 is configured for determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

The material arrangement task may further include at least one of the followings: a source storage space number, a destination storage space number, a number of the material to be arranged, a quantity of the packing case for the material to be arranged, a name of the material to be arranged, a batch number of the material to be arranged, and a manufacturer of the material to be arranged, description information of the material to be arranged, a currently available stock of the material to be arranged, a special stock identifier of the material to be arranged, a creator of the material arrangement task, and creation time of the material arrangement task.

It is not difficult to understand that materials stored in a packing case to be arranged are the materials to be arranged, and the arrangement for the packing case to be arranged is the arrangement for the materials to be arranged.

Figure 10:
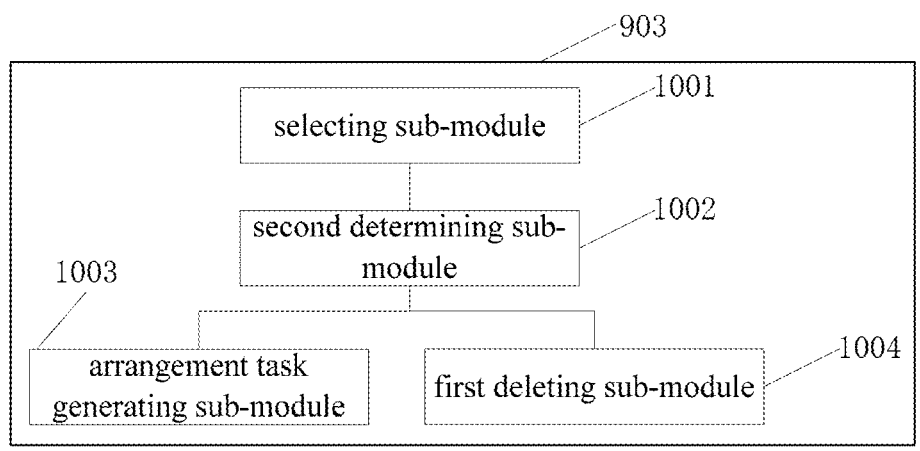
FIG. 10 is a specific structural block diagram of 903 in FIG. 9.

In a specific implementation provided by the embodiment of the present application, as shown in FIG. 10, the first determining module 903 includes a selecting sub-module 1001, a second determining sub-module 1002, and an arrangement task generating sub-module 1003.

The selecting sub-module 1001 is configured for selecting one storage space from the destination storage space set arbitrarily as a first destination storage space, and calculating a remaining volume of the first destination storage space.

Specifically, the selecting sub-module 1001 can determine the volume of the first destination storage space and the volume of the stored material in the first destination storage space according to the shelf information stored in the pre-established information database, and calculate the difference between the two, thereby obtaining the remaining volume of the first destination storage space.

The second determining sub-module 1002 is configured for determining whether there is a first source storage space in the source storage space set; if yes, triggering the arrangement task generating sub-module 1003; optionally, if the first source storage space does not exist, triggering a first deleting sub-module 1004.

The first source storage space is of a same storage type as the first destination storage space and there is at least one packing case whose volume is less than the remaining volume in the movable inventory of the first source storage space.

The storage type generally refers to a type of material that the storage space can store. For example, a storage type of a storage space is a button cell type.

Specifically, the movable inventory of the first source storage space and the volume of each packing case in the movable inventory are determined according to the pre-stored inventory information.

In this embodiment, optionally, the volume of the first source storage space and the first destination storage space are also the same.

The arrangement task generating sub-module 1003 is configured for determining, in a case that a determination result obtained by the second determining sub-module is YES, a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

Since the pre-stored inventory information includes the volume of the packing case for materials, the volume of each packing case in the movable inventory of the first source storage space may be determined according to the inventory information, and multiple packing cases with a total volume not greater than the remaining volume can be selected therefrom.

It can be understood that the multiple packing cases may be exactly all the packing cases in the movable inventory in the first source storage space, or may be several packing cases in the movable inventory in the first source storage space, or even just one crate, which is all reasonable.

In a specific implementation of the embodiment of the present application, in order to ensure that the service life of the first destination storage space is not damaged, optionally, the arrangement task generating sub-module 1003 is specifically configured for determining, according to the inventory information, a volume and a weight of each packing case in the movable inventory of the first source storage space; selecting, from the movable inventory of the first source storage space, one or more packing cases with a total volume not greater than the remaining volume and with a total weight not greater than a remaining admissible weight of the first destination storage space.

Optionally, the first determining module 103 may further include a first deleting module 1004, which is configured for deleting the first destination storage space from the destination storage space set when a determination result obtained by the second determining sub-module is NO.

If there is no first source storage space in the source storage space set, it means that there is no material in the source storage space set that can be arranged to the first destination storage space. Therefore, the first destination storage space needs to be deleted from the destination storage space set to avoid repeated generation of material arrangement tasks for the first destination storage space, and thereby avoid wasting resources.

The apparatus for generating a material arrangement task provided by the present embodiment can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Optionally, the apparatus for generating a material arrangement task provided by the embodiment shown in FIG. 9 may further include a second determining module and a first deleting module.

The second determining module is configured for determining, before triggering the first determining module 903, whether a weight of a material stored on a shelf where a destination storage space is located exceeds a fourth threshold, if yes, triggering the first deleting module, otherwise, triggering the first determining module 903 directly.

The fourth threshold is not greater than a maximum load capacity of the shelf where the destination storage space is located.

The first deleting module is configured for deleting the destination storage space from the destination storage space set and triggering the first determining module 903.

It can be seen that, in the embodiment, when a material arrangement task is generated, the maximum load capacity of the shelf where the destination storage space is located is also considered. When the weight of the stored material of the shelf where the target storage space is located exceeds the fourth threshold, materials are not placed in the destination storage space anymore to avoid damage to the service life of the shelf where the destination storage space is located.

Optionally, the apparatus for generating a material arrangement task provided by the embodiment of the present application may further include:

a first triggering module, configured for repeatedly triggering the selecting sub-module 1001, the second determining sub-module 1002, and the arrangement task generating sub-module 1003 so as to generate multiple material arrangement tasks.

Specifically, in a specific implementation of the embodiment of the present application, as shown in FIG. 10, when the first determining module includes the selecting sub-module 1001, the second determining sub-module 1002, and the arrangement task generating sub-module 1003, the first triggering module is directly triggered.

Specifically, in a specific implementation of the embodiment of the present application, as shown in FIG. 10, when the first determining module further includes the first deleting sub-module 1004, the apparatus further includes:

a third determining module, configured for determining whether the destination storage space set is empty; if not, triggering the first triggering module; if so, ending the process.

It can be understood that the modules 1001 to 1004 are repeatedly triggered until the destination storage space set is empty, which means that there is no destination storage space in the target area that can receive the materials to be arranged, and the material arrangement tasks for the target area are all generated, and the process can be ended.

Figure 11:
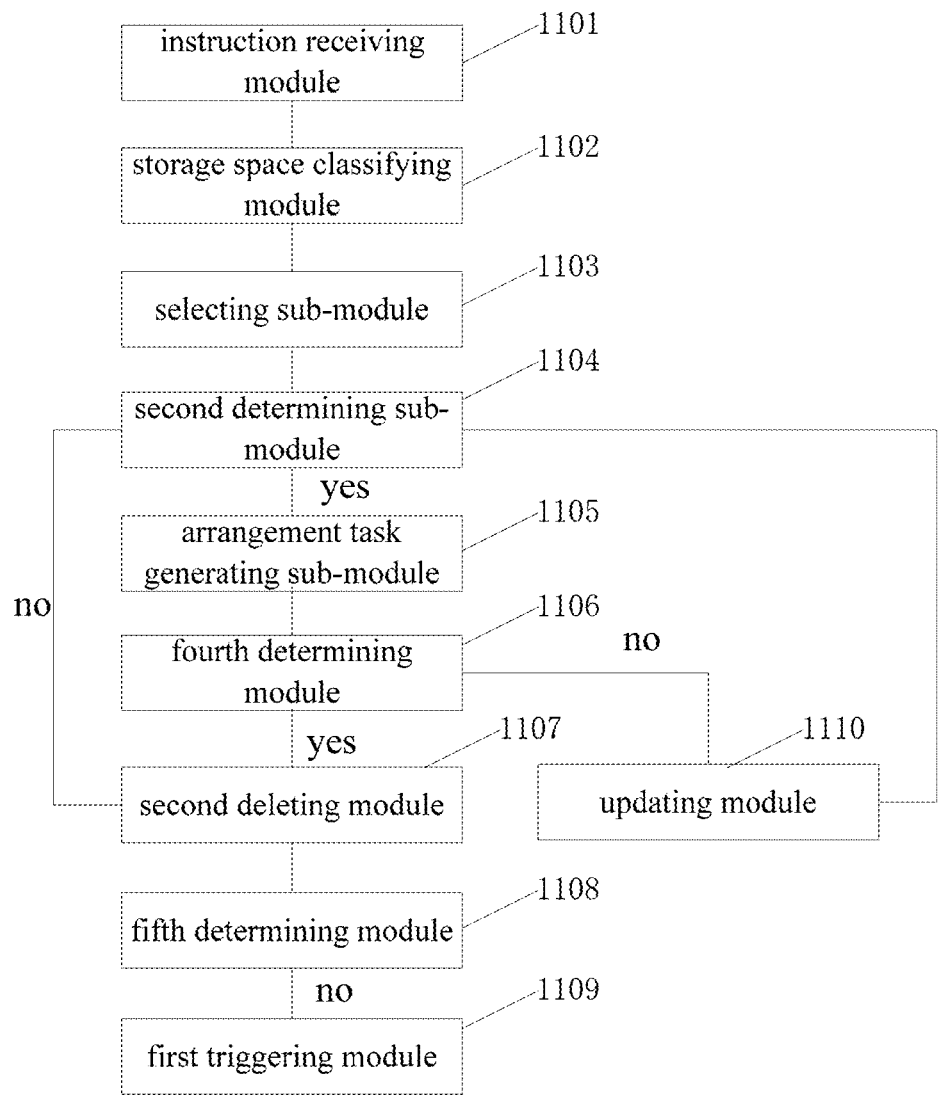
FIG. 11 is a structural block diagram of another apparatus for generating a material arrangement task provided by an embodiment of the present application.

FIG. 11 shows an apparatus for generating a material arrangement task provided by an embodiment of the present application. As shown in FIG. 11, the apparatus includes an instruction receiving module 1101, a storage space classifying module 1102, a selecting sub-module 1103, a second determining sub-module 1104, an arrangement task generating sub-module 1105, a fourth determining module 1106, and a second deleting module 1107, a fifth determining module 1108, a first triggering module 1109, and an updating module 1110.

The instruction receiving module 1101 is configured for receiving a target area arrangement instruction for a target warehouse, wherein the instruction includes at least one shelf number.

The storage space classifying module 1102 is configured for classifying a storage space corresponding to each shelf number in the instruction into a destination storage space set or a source storage space set according to pre-stored inventory information of the target warehouse.

It should be noted that the processes performed by the modules 1101 and 1102 are respectively consistent with those performed by the modules 901 and 902 in FIG. 9, and therefore, the modules 1101 and 1102 are not described in detail in this embodiment.

The selecting sub-module 1103 is configured for selecting one storage space from the destination storage space set arbitrarily as a first destination storage space, and calculating a remaining volume of the first destination storage space.

The second determining sub-module 1104 is configured for determining whether there is a first source storage space in the source storage space set; if yes, triggering the arrangement task generating module 1105; otherwise, triggering the second deleting module 1107.

The first source storage space is of a same storage type as the first destination storage space and there is at least one packing case whose volume is less than the remaining volume in the movable inventory of the first source storage space.

The arrangement task generating sub-module 1105 is configured for determining, according to the inventory information, a volume of each packing case in the movable inventory of the first source storage space; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space.

It should be noted that the processes performed by the modules 1103, 1104 and 1105 are respectively consistent with those performed by the modules 1001 to 1003 in FIG. 10, and therefore, the modules 1103, 1104 and 1105 are not described in detail in this embodiment.

The fourth determining module 1106 is configured for determining whether a difference between the remaining volume of the first destination storage space and a total volume of the packing case to be arranged selected from the first source storage space is less than a third threshold; if yes, triggering the second deleting module 1107; if not, triggering the updating module 1110.

The third threshold is set according to the storage type of the destination storage space. Generally, the third threshold is a volume of the smallest packing case for the material that can be stored in the storage space, and may of course be set according to experiences.

The second deleting module 1107 is configured for deleting the first destination storage space from the destination storage space set.

The fifth determining module 1108 is configured for determining whether the destination storage space set is empty, and if not, triggering the first triggering module 1109; if so, ending the process.

When the destination storage space set is empty, it means it is no longer necessary to arrange the target area. Therefore, only if the destination storage space set is not empty, it is necessary to further trigger the first triggering module 1109 to generate multiple material arrangement tasks.

The first triggering module 1109 is configured for triggering the selecting sub-module 1103, the second determining sub-module 1104, and the arrangement task generating sub-module 1105 so as to generate multiple material arrangement tasks.

The update module is configured for updating the remaining volume of the first destination storage space according to the difference between the remaining volume and the total volume of the packing case to be arranged if a determination result obtained by the second determining module is NO, and triggering the second determining sub-module 1104.

Specifically, the remaining volume of the first destination storage space is updated to be the difference between the value of the remaining volume obtained by calculation by the selecting sub-module 1103 and the total volume of the packing cases selected by the arrangement task generating sub-module 1105.

The apparatus for generating a material arrangement task provided by the embodiment of the present application can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Figure 12:
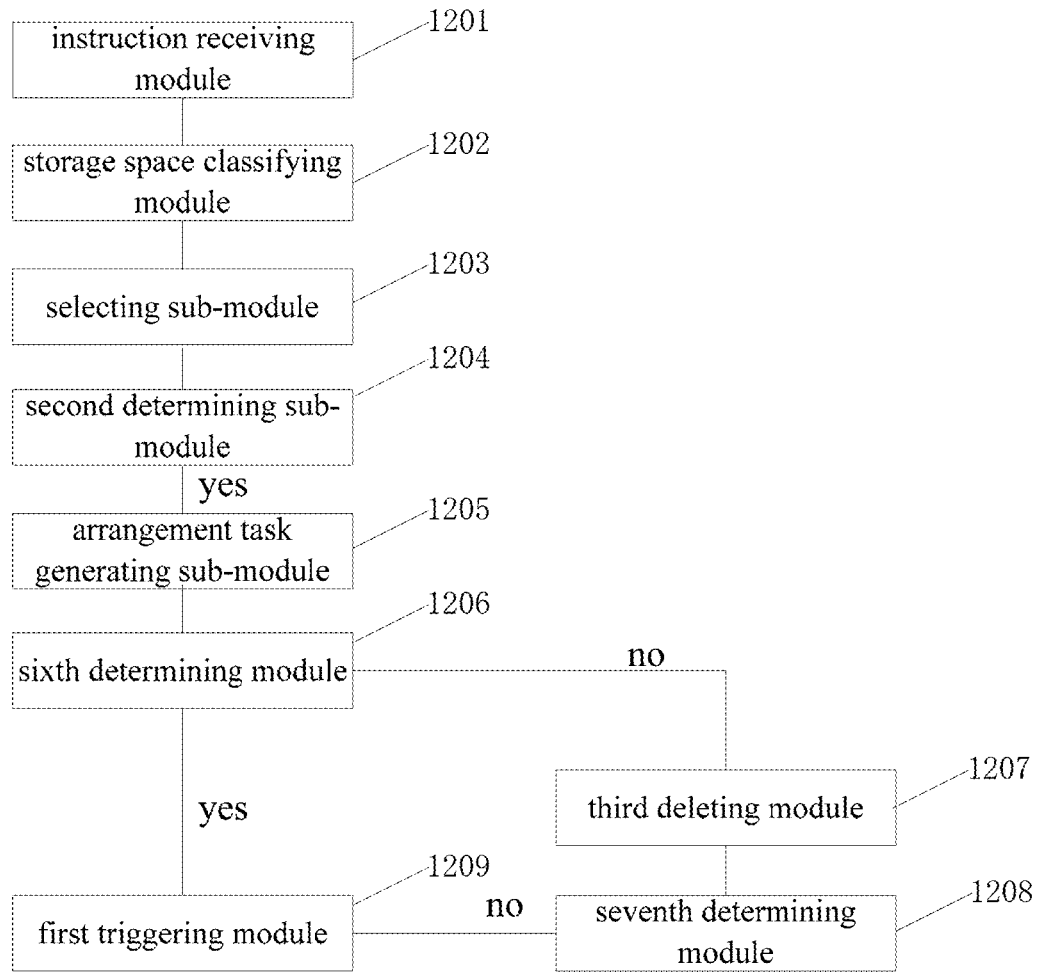
FIG. 12 is a structural block diagram of another apparatus for generating a material arrangement task provided by an embodiment of the present application.

FIG. 12 shows an apparatus for generating a material arrangement task provided by an embodiment of the present application. As shown in FIG. 12, the apparatus includes an instruction receiving module 1201, a storage space classifying module 1202, a selecting sub-module 1203, a second determining sub-module 1204, an arrangement task generating sub-module 1205, a sixth determining module 1206, and a third deleting module 1207, a seventh determining module 1208 and a first triggering module 1209.

The processes performed by the modules 1201 to 1205 are consistent with those performed by the modules 1101 to 1105 in FIG. 11 respectively, and therefore, the modules 1201 to 1205 are not described in detail in this embodiment.

The sixth determining module 1206 is configured for determining whether there is any remaining movable inventory in the first source storage space before triggering the first triggering module; if so, triggering the first triggering module 1209; otherwise, triggering the third deleting module 1207.

The third deleting module 1207 is configured for deleting the first source storage space from the source storage space set.

The seventh determining module 1208 is configured for determining whether the source storage space set is empty; if so, end the process; otherwise, triggering the first triggering module 1209.

When the source storage space set is empty, it means there is no material needed to be arranged in the target area. Therefore, only if the source storage space set is not empty, it is necessary to trigger the first triggering module 1209.

The first triggering module 1209 is configured for triggering the selecting sub-module 1203, the second determining sub-module 1204, and the arrangement task generating sub-module 1205 to generate multiple material arrangement tasks.

The apparatus for generating a material arrangement task provided by the embodiment can automatically generate a material arrangement task after receiving a target area arrangement instruction based on the pre-stored inventory information, without checking each storage space one by one in the warehouse by an operator manually. Compared with the related art, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

Optionally, the apparatus for generating a material arrangement task provided by the embodiment of the present application may further include a merging module.

The merging module is configured for merging multiple material arrangement tasks with a same shelf number corresponding to the source storage space and a same shelf number corresponding to the destination storage space into a same material arrangement task.

Alternatively, the merging module is configured for merging multiple material arrangement tasks with a same shelf number corresponding to the source storage space into a same material arrangement task.

Alternatively, the merging module is configured for merging multiple material arrangement tasks with a same shelf number corresponding to the destination storage space into a same material arrangement task.

It is not difficult to understand that since the embodiments of the present application use a robot to perform material arrangement, after merging the material arrangement tasks with a same shelf number corresponding to the source storage space and/or a same shelf number corresponding to the destination storage space, the robot can fulfil more material arrangement tasks when carrying the shelf once, and thus avoiding the waste of resources caused by the robot carrying the same shelf repeatedly.

An apparatus for arranging a material provided by an embodiment of the present application will be described below.

Figure 13:
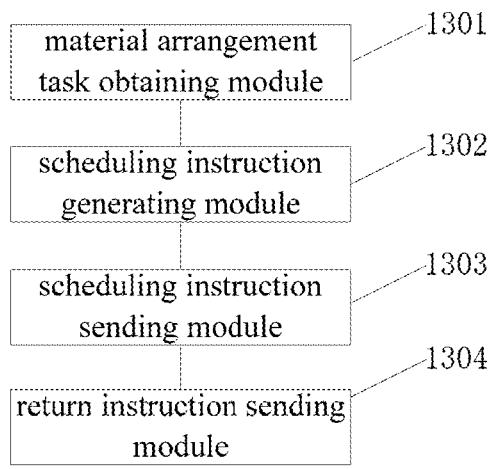
FIG. 13 is a structural block diagram of an apparatus for arranging a material provided by an embodiment of the present application.

FIG. 13 shows a structural block diagram of an apparatus for arranging a material according to an embodiment of the present application. As shown in FIG. 13, the apparatus includes a material arrangement task obtaining module 1301, a scheduling instruction generating module 1302, a scheduling instruction sending module 1303 and a return instruction sending module 1304.

The material arrangement task obtaining module 1301 is configured for obtaining a material arrangement task generated by any embodiment of the present application.

The scheduling instruction generating module 1302 is configured for generating a scheduling instruction for scheduling at least one robot according to the shelf number included in the material arrangement task.

In the embodiment of the present application, since one robot can only carry one shelf at a time, a plurality of scheduling instructions corresponding to the shelf number can be generated.

Since there may be more than one material arrangement task, the material arrangement task that actually needs to be done is determined first. The material arrangement task carries all the information of the material to be arranged, and the material arrangement task is sent to a robot management system. The robot management system analyses the material arrangement task to generate a scheduling instruction, and transmits the scheduling instruction to at least one robot.

The scheduling instruction sending module 1303 is configured for sending the scheduling instruction carrying the shelf number to the at least one robot, so as to cause the at least one robot to transport a shelf corresponding to the shelf number to a preset position.

The generated scheduling instructions may be first ordered in a certain sequence. After ordering, the scheduling instructions are sequentially sent to the corresponding robot according to the number of robots, so that the robots executes the current scheduling instructions in sequence, and then execute a next scheduling instruction.

The preset position is a specified position in the target warehouse, and in the actual application, the preset position is a workbench. The workbench is a platform for operators to pick up goods and inquire material preparation tasks.

The return instruction sending module 1304 is configured for sending a return instruction to the at least one robot, so as to cause the at least one robot to transport the shelf corresponding to the shelf number to an initial position when a second preset condition is satisfied.

The second preset condition is that the stay time of the at least one robot in the preset position exceeds a fifth threshold; or, a preset instruction is received.

The initial position is the original position of the shelf in the target warehouse.

Optionally, the scheduling instruction further carries a moving path of the robot, where the moving path is determined according to a map of the target warehouse and a position of the carried shelf on the warehouse's map.

For the apparatus for arranging a material provided by the embodiment of the present application, on the one hand, a material arrangement task is generated by applying the apparatus for generating a material arrangement task provided by the embodiment of the present application; on the other hand, a robot is used for shelf transportation to complete the material arrangement. Therefore, compared with the related art, the time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

For the apparatus embodiments, since they are basically similar to the method embodiments, the descriptions thereof are relatively simple, and relevant part can be referred to the description of the method embodiments.

The present application further provides an application program, the application program is configured for performing, when being executed, a method for generating a material arrangement task provided by the embodiment of the present application, or performing a method for arranging a material provided by the embodiment of the present application.

The method for generating a material arrangement task may include:

receiving a target area arrangement instruction for a target warehouse, wherein the instruction includes at least one shelf number;

classifying a storage space corresponding to each shelf number in the instruction into a destination storage space set or a source storage space set according to pre-stored inventory information of the target warehouse;

determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

It can be seen that by executing the application program provided by the embodiment of the present application, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

The method for arranging a material may include:

obtaining a material arrangement task generated by the method for generating a material arrangement;

generating a scheduling instruction for scheduling at least one robot according to the shelf number included in the material arrangement task;

sending the scheduling instruction carrying the shelf number to the at least one robot, so as to cause the at least one robot to transport a shelf corresponding to the shelf number to a preset position;

when a second preset condition is satisfied, sending a return instruction to the at least one robot, so as to cause the at least one robot to transport the shelf corresponding to the shelf number to an initial position.

It can be seen that by executing the application program provided by the embodiment of the present application, the time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

For the application program embodiment, since it is basically similar to the method embodiment, the description is relatively simple. The application program embodiment for performing, when being executed, the method for generating a material arrangement task provided by the embodiment of the present application can be referred to the method embodiments shown in FIG. 1 and FIG. 3 to FIG. 5. The application program embodiment for performing, when being executed, the method for arranging a material provided by the embodiment of the present application can be referred to the method embodiment shown in FIG. 6.

The present application further provides a storage medium, which is configured for storing an application program, wherein the application program is used to perform, when being executed, a method for generating a material arrangement task provided by the embodiment of the present application, or to perform a method for arranging a material provided by the embodiment of the present application.

The method for generating a material arrangement task may include:

receiving a target area arrangement instruction for a target warehouse, wherein the instruction includes at least one shelf number;

classifying a storage space corresponding to each shelf number in the instruction into a destination storage space set or a source storage space set according to pre-stored inventory information of the target warehouse;

determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

It can be seen that by executing the application program stored in the storage medium provided by the embodiment of the present application, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

The method for arranging a material may include:

obtaining a material arrangement task generated by the method for generating a material arrangement task;

generating a scheduling instruction for scheduling at least one robot according to the shelf number included in the material arrangement task;

sending the scheduling instruction carrying the shelf number to the at least one robot, so as to cause the at least one robot to transport a shelf corresponding to the shelf number to a preset position;

when a second preset condition is satisfied, sending a return instruction to the at least one robot, so as to cause the at least one robot to transport the shelf corresponding to the shelf number to an initial position.

It can be seen that by executing the application program stored in the storage medium provided by the embodiment of the present application, the time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

For the storage medium embodiment, since it is basically similar to the method embodiment, the description is relatively simple. The storage medium embodiment in which the storage medium stores an application program for performing, when being executed, the method for generating a material arrangement task provided by the embodiment of the present application can be referred to the method embodiments shown in FIG. 1 and FIG. 3 to FIG. 5. The storage medium embodiment in which the storage medium stores an application program for performing, when being executed, the method for arranging a material provided by the embodiment of the present application can be referred to the method embodiment shown in FIG. 6.

Figure 14:
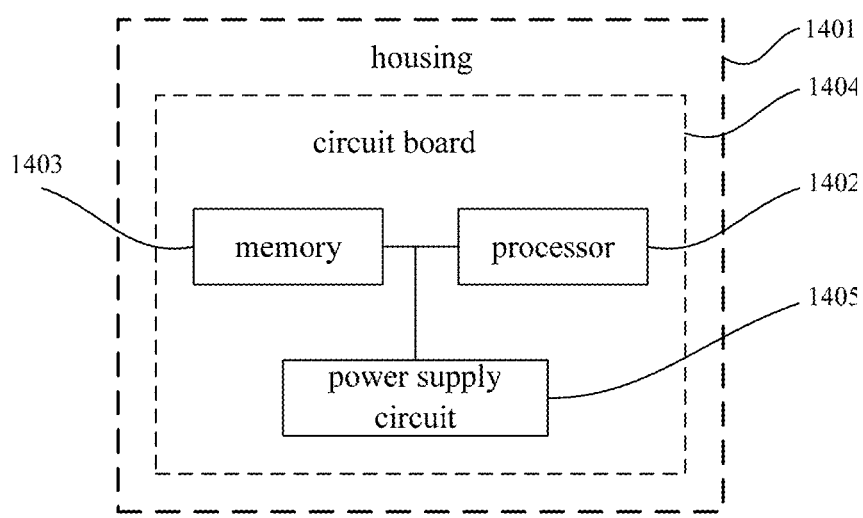
FIG. 14 is a structural block diagram of an electronic device provided by an embodiment of the present application.

In addition, as shown in FIG. 14, according to an embodiment of the present application, an electronic device is further provided, and the electronic device may include:

a housing 1401, a processor 1402, a memory 1403, a circuit board 1404, and a power supply circuit 1405, wherein the circuit board 1404 is disposed inside a space enclosed by the housing 1401, and the processor 1402 and the memory 1403 are disposed on the circuit board 1404; the power supply circuit 1405 is used for powering various circuits or components of the electronic device; the memory 1403 is configured for storing executable program code; the processor 1402 is configured for executing a program corresponding to the executable program code by reading the executable program code stored in the memory 1403, so as to perform the method for generating a material arrangement task provided by the embodiment of the present application, or the method for arranging a material provided by the embodiment of the present application.

The method for generating a material arrangement task may include:

receiving a target area arrangement instruction for a target warehouse, wherein the instruction includes at least one shelf number;

classifying a storage space corresponding to each shelf number in the instruction into a destination storage space set or a source storage space set according to pre-stored inventory information of the target warehouse;

determining whether there is at least one packing case within a storage space in the source storage space set which can be moved into a storage space in the destination storage space set, and if so, generating a material arrangement task; wherein the material arrangement task includes a shelf number corresponding to a source storage space and/or a shelf number corresponding to a destination storage space.

It can be seen that through the solution provided by the embodiment of the present application, the time for generating material arrangement tasks can be significantly shortened, the efficiency of generating material arrangement tasks is greatly improved, and the material arrangement efficiency of a target warehouse is in turn greatly improved, and the efficiency of warehouse management is finally improved. In addition, the cost of warehouse management is reduced since manual operation is spared.

The method for arranging a material may include:

obtaining a material arrangement task generated by the method for generating a material arrangement task;

generating a scheduling instruction for scheduling at least one robot according to the shelf number included in the material arrangement task;

sending the scheduling instruction carrying the shelf number to the at least one robot, so as to cause the at least one robot to transport a shelf corresponding to the shelf number to a preset position;

when a second preset condition is satisfied, sending a return instruction to the at least one robot, so as to cause the at least one robot to transport the shelf corresponding to the shelf number to an initial position.

It can be seen that in the present embodiment, the time for arranging the material can be significantly shortened, thereby greatly improving the material arrangement efficiency of a target warehouse, and finally improving the efficiency of warehouse management. In addition, since the manual operation is reduced, the cost of warehouse management can also be reduced.

In this embodiment, the electronic device may have various forms including, but not limited to:

(1) Mobile communication devices: these devices are characterized by mobile communication functions and are mainly aimed at providing voice and data communication. Such terminals include smart phones (such as an iPhone), multimedia phones, functional phones, and low-end phones.

(2) Ultra-mobile personal computer equipment: this type of equipment belongs to the category of personal computers, has computing and processing functions, and generally has mobile Internet access. Such terminals include PDAs, MIDs, and UMPC devices, such as the iPad.

(3) Portable entertainment devices: these devices can display and play multimedia content. Such devices include audio, video players (such as an iPod), handheld game consoles, e-books, and smart toys and portable car navigation devices.

(4) Server: a device that provides computing services. The server consists of a processor, a hard disk, a memory, a system bus, etc. The server is similar to a general-purpose computer architecture, but due to the need to provide highly reliable services, the server has higher requirements in terms of processing ability, stability, reliability, security, scalability, and manageability.

(5) Other electronic devices with data interaction functions.

For the electronic device embodiment, since it is basically similar to the method embodiment, the description is relatively simple. The electronic device embodiment in which the application program stored therein is used for performing, when being executed, the method for generating a material arrangement task provided by the embodiment of the present application can be referred to the method embodiments shown in FIG. 1 and FIG. 3 to FIG. 5. The electronic device embodiment in which the application program stored therein is used for performing, when being executed, the method for arranging a material provided by the embodiment of the present application can be referred to the method embodiment shown in FIG. 6.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

The various embodiments in the present specification are described in a related manner, and the same or similar parts between the various embodiments may be referred to each other, and each embodiment focuses on the differences from the other embodiments. In particular, for the system embodiment, since it is basically similar to the method embodiment, the description is relatively simple, and the relevant parts can be referred to the description of the method embodiment.

The above description is only the preferred embodiment of the present application, and is not intended to limit the protection scope of the present application. Any modifications, equivalent substitutions, improvements, and the like made within the spirit and principles of the present application fall within the protection scope of the present application.

The invention claimed is:

1. A method for arranging a material by an intelligent management system of a target warehouse comprising a processor, comprising:

receiving a target area arrangement instruction for the target warehouse, wherein the instruction comprises at least one shelf number;

classifying a storage space corresponding to each shelf number in the instruction into a destination storage space set or a source storage space set according to pre-stored inventory information of the target warehouse;

determining whether there is at least one packing case within a storage space in the source storage space set which can be moved into a storage space in the destination storage space set, and if so, generating a material arrangement task; wherein the material arrangement task comprises a shelf number corresponding to a source storage space and/or a shelf number corresponding to a destination storage space;

generating a scheduling instruction for scheduling at least one robot according to the shelf number comprised in the material arrangement task;

sending the scheduling instruction carrying the shelf number to the at least one robot, so as to cause the at least one robot to transport a shelf corresponding to the shelf number corresponding to the source storage space to a preset position;

wherein, before the step of determining whether there is at least one packing case within a storage space in the source storage space set which can be moved into a storage space in the destination storage space set, the method further comprises:

determining whether a weight of a material stored on a shelf where a destination storage space is located exceeds a fourth threshold, wherein the fourth threshold is not greater than a maximum load capacity of the shelf where the destination storage space is located;

if the fourth threshold is exceeded, deleting the destination storage space from the destination storage space set;

wherein the step of determining whether there is at least one packing case within a storage space in the source storage space set which can be moved into a storage space in the destination storage space set, and if so, generating a material arrangement task comprises:

selecting one storage space from the destination storage space set arbitrarily as a first destination storage space, and calculating a remaining volume of the first destination storage space;

determining whether there is a first source storage space in the source storage space set; wherein the first source storage space is of a same storage type as the first destination storage space and there is at least one packing case whose volume is less than the remaining volume in the movable inventory of the first source storage space;

if the first source storage space exists, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space;

wherein, the method further comprises:

repeatedly performing the step of selecting one storage space from the destination storage space set arbitrarily as a first destination storage space to the step of generating a material arrangement task, so as to generate multiple material arrangement tasks;
wherein, before repeatedly performing the step of selecting one storage space from the destination storage space set arbitrarily as a first destination storage space to the step of generating a material arrangement task, the method further comprises:
determining whether there is any remaining movable inventory in the first source storage space;
if there is remaining movable inventory, repeatedly performing the step of selecting one storage space from the destination storage space set arbitrarily as a first destination storage space to the step of generating a material arrangement task;
if there is no remaining movable inventory, deleting the first source storage space from the source storage space set, and in a case that the source storage space set is not empty, repeatedly performing the step of selecting one storage space from the destination storage space set arbitrarily as a first destination storage space to the step of generating a material arrangement task.

2. The method according to claim 1, wherein, the step of classifying a storage space corresponding to each shelf number in the instruction into a destination storage space set or a source storage space set comprises:
selecting, from the instruction, a shelf number of a shelf with a total weight not greater than a maximum load capacity of a robot;
classifying a storage space corresponding to each selected shelf number into the destination storage space set and the source storage space set.

3. The method according to claim 1, wherein, the step of classifying a storage space corresponding to each shelf number in the instruction into a destination storage space set or a source storage space set according to pre-stored inventory information of the target warehouse comprises:
obtaining, according to the pre-stored inventory information of the target warehouse, a storage space corresponding to each shelf number in the instruction;
determining, according to the inventory information, a volume of a movable inventory of each storage space;
determining whether the volume of the movable inventory of each storage space is not greater than a first threshold; if the volume of the movable inventory of the storage space is not greater than the first threshold, determining the storage space as a source storage space; if the volume of the movable inventory of the storage space is greater than the first threshold, determining the storage space as a destination storage space;
classifying all source storage spaces into the source storage space set, and classifying all destination storage spaces into the destination storage space set.

4. The method according to claim 1, wherein, the step of determining a volume of each packing case in the movable inventory of the first source storage space according to the inventory information; selecting, from the movable inventory, one or more packing cases with a total volume not greater than the remaining volume comprises:
determining, according to the inventory information, a volume and a weight of each packing case in the movable inventory of the first source storage space;
selecting, from the movable inventory of the first source storage space, one or more packing cases with a total volume not greater than the remaining volume and with a total weight not greater than a remaining admissible weight of the first destination storage space.

5. The method according to claim 1, wherein, before repeatedly performing the step of selecting one storage space from the destination storage space set arbitrarily as a first destination storage space to the step of generating a material arrangement task, the method further comprises:
if the first source storage space does not exist, deleting the first destination storage space from the destination storage space set;
determining whether the destination storage space set is empty, and if the destination storage space set is not empty, repeatedly performing the step of selecting one storage space from the destination storage space set arbitrarily as a first destination storage space to the step of generating a material arrangement task.

6. The method according to claim 1, wherein, before repeatedly performing the step of selecting one storage space from the destination storage space set arbitrarily as a first destination storage space to the step of generating a material arrangement task, the method further comprises:
determining whether a difference between the remaining volume of the first destination storage space and a total volume of the packing case to be arranged is less than a third threshold;
if the difference is less than the third threshold, deleting the first destination storage space from the destination storage space set, and in a case that the destination storage space set is not empty, repeatedly performing the step of selecting one storage space from the destination storage space set arbitrarily as a first destination storage space to the step of generating a material arrangement task;
if the difference is not less than the third threshold, updating the remaining volume of the first destination storage space according to the difference between the remaining volume and the total volume of the packing case to be arranged, and repeatedly performing the step of determining whether there is a first source storage space in the source storage space set to the step of generating a material arrangement task.

7. The method according to claim 1, wherein, the method further comprises:
merging multiple material arrangement tasks with a same shelf number corresponding to the source storage space and a same shelf number corresponding to the destination storage space into a same material arrangement task;
alternatively, merging multiple material arrangement tasks with a same shelf number corresponding to the source storage space into a same material arrangement task;
alternatively, merging multiple material arrangement tasks with a same shelf number corresponding to the destination storage space into a same material arrangement task.

8. The method according to claim 3, wherein, the movable inventory refers to an inventory that meets a first preset condition; wherein the first preset condition comprises one or a combination of: a storage space storing the inventory not being locked up, no stocktake being performed for the storage space, no material stored on the storage space being transported out of the warehouse, no material stored on the storage space being transported into the warehouse, and the inventory stored in the storage space being available.

9. The method according to claim 1, comprising:
when a second preset condition is satisfied, sending a return instruction to the at least one robot, so as to cause the at least one robot to transport the shelf corresponding to the shelf number corresponding to the source storage space to an initial position.

10. The method according to claim 9, wherein, the second preset condition is that:
stay time of the at least one robot in the preset position exceeds a fifth threshold; or, a preset instruction is received.

11. A non-transitory storage medium, wherein the storage medium is configured for storing an application program, wherein the application program is used to perform a method for arranging a material by an intelligent management system of a target warehouse comprising a processor when being executed, the method comprising:
receiving a target area arrangement instruction for the target warehouse, wherein the instruction comprises at least one shelf number;
classifying a storage space corresponding to each shelf number in the instruction into a destination storage space set or a source storage space set according to pre-stored inventory information of the target warehouse;
determining whether there is at least one packing case within a storage space in the source storage space set which can be moved into a storage space in the destination storage space set, and if so, generating a material arrangement task; wherein the material arrangement task comprises a shelf number corresponding to a source storage space and/or a shelf number corresponding to a destination storage space;
generating a scheduling instruction for scheduling at least one robot according to the shelf number comprised in the material arrangement task;
sending the scheduling instruction carrying the shelf number to the at least one robot, so as to cause the at least one robot to transport a shelf corresponding to the shelf number corresponding to the source storage space to a preset position;
wherein, before the step of determining whether there is at least one packing case within a storage space in the source storage space set which can be moved into a storage space in the destination storage space set, the method further comprises:
determining whether a weight of a material stored on a shelf where a destination storage space is located exceeds a fourth threshold, wherein the fourth threshold is not greater than a maximum load capacity of the shelf where the destination storage space is located;
if the fourth threshold is exceeded, deleting the destination storage space from the destination storage space set;
wherein the step of determining whether there is at least one packing case within a storage space in the source storage space set which can be moved into a storage space in the destination storage space set, and if so, generating a material arrangement task comprises:
selecting one storage space from the destination storage space set arbitrarily as a first destination storage space, and calculating a remaining volume of the first destination storage space;
determining whether there is a first source storage space in the source storage space set; wherein the first source storage space is of a same storage type as the first destination storage space and there is at least one packing case whose volume is less than the remaining volume in the movable inventory of the first source storage space;
if the first source storage space exists, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space;
wherein, the method further comprises:
repeatedly performing the step of selecting one storage space from the destination storage space set arbitrarily as a first destination storage space to the step of generating a material arrangement task, so as to generate multiple material arrangement tasks;
wherein, before repeatedly performing the step of selecting one storage space from the destination storage space set arbitrarily as a first destination storage space to the step of generating a material arrangement task, the method further comprises:
determining whether there is any remaining movable inventory in the first source storage space;
if there is remaining movable inventory, repeatedly performing the step of selecting one storage space from the destination storage space set arbitrarily as a first destination storage space to the step of generating a material arrangement task;
if there is no remaining movable inventory, deleting the first source storage space from the source storage space set, and in a case that the source storage space set is not empty, repeatedly performing the step of selecting one storage space from the destination storage space set arbitrarily as a first destination storage space to the step of generating a material arrangement task.

12. An intelligent management system, wherein the intelligent management system comprises a processor and a memory, wherein the memory is configured for storing executable program code, the processor executes a program corresponding to the executable program code by reading the executable program code stored in the memory, so as to perform a method of arranging a material by an intelligent management system of a target warehouse comprising a processor, the method comprising:
receiving a target area arrangement instruction for the target warehouse, wherein the instruction comprises at least one shelf number;
classifying a storage space corresponding to each shelf number in the instruction into a destination storage space set or a source storage space set according to pre-stored inventory information of the target warehouse;
determining whether there is at least one packing case within a storage space in the source storage space set which can be moved into a storage space in the destination storage space set, and if so, generating a material arrangement task; wherein the material arrangement task comprises a shelf number corresponding to a source storage space and/or a shelf number corresponding to a destination storage space;
generating a scheduling instruction for scheduling at least one robot according to the shelf number comprised in the material arrangement task;
sending the scheduling instruction carrying the shelf number to the at least one robot, so as to cause the at least one robot to transport a shelf corresponding to the shelf number corresponding to the source storage space to a preset position;

wherein, before the step of determining whether there is at least one packing case within a storage space in the source storage space set which can be moved into a storage space in the destination storage space set, the method further comprises:

determining whether a weight of a material stored on a shelf where a destination storage space is located exceeds a fourth threshold, wherein the fourth threshold is not greater than a maximum load capacity of the shelf where the destination storage space is located;

if the fourth threshold is exceeded, deleting the destination storage space from the destination storage space set;

wherein the step of determining whether there is at least one packing case within a storage space in the source storage space set which can be moved into a storage space in the destination storage space set, and if so, generating a material arrangement task comprises:

selecting one storage space from the destination storage space set arbitrarily as a first destination storage space, and calculating a remaining volume of the first destination storage space;

determining whether there is a first source storage space in the source storage space set; wherein the first source storage space is of a same storage type as the first destination storage space and there is at least one packing case whose volume is less than the remaining volume in the movable inventory of the first source storage space;

if the first source storage space exists, determining a volume of each packing case in the movable inventory of the first source storage space according to the inventory information; selecting, from the movable inventory, one or more packing cases with a total volume not greater than the remaining volume; using the one or more packing cases as a packing case to be arranged, and generating a material arrangement task of moving the packing case to be arranged from the first source storage space to the first destination storage space;

wherein, the method further comprises:

repeatedly performing the step of selecting one storage space from the destination storage space set arbitrarily as a first destination storage space to the step of generating a material arrangement task, so as to generate multiple material arrangement tasks;

wherein, before repeatedly performing the step of selecting one storage space from the destination storage space set arbitrarily as a first destination storage space to the step of generating a material arrangement task, the method further comprises:

determining whether there is any remaining movable inventory in the first source storage space;

if there is remaining movable inventory, repeatedly performing the step of selecting one storage space from the destination storage space set arbitrarily as a first destination storage space to the step of generating a material arrangement task;

if there is no remaining movable inventory, deleting the first source storage space from the source storage space set, and in a case that the source storage space set is not empty, repeatedly performing the step of selecting one storage space from the destination storage space set arbitrarily as a first destination storage space to the step of generating a material arrangement task.

13. The non-transitory storage medium of claim 11, wherein when a second preset condition is satisfied, sending a return instruction to the at least one robot, so as to cause the at least one robot to transport the shelf corresponding to the shelf number corresponding to the source storage space to an initial position.

14. The intelligent management system of claim 12, wherein when a second preset condition is satisfied, sending a return instruction to the at least one robot, so as to cause the at least one robot to transport the shelf corresponding to the shelf number corresponding to the source storage space to an initial position.

* * * * *

UNITED STATES PATENT AND TRADEMARK OFFICE
CERTIFICATE OF CORRECTION

PATENT NO. : 11,270,256 B2
APPLICATION NO. : 16/468242
DATED : March 8, 2022
INVENTOR(S) : Zhou et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 112 days.

Signed and Sealed this
Twenty-fifth Day of April, 2023

Katherine Kelly Vidal
*Director of the United States Patent and Trademark Office*